(12) United States Patent
Graham et al.

(10) Patent No.: US 11,505,917 B2
(45) Date of Patent: Nov. 22, 2022

(54) WORK VEHICLE MAGNETORHEOLOGICAL FLUID JOYSTICK SYSTEMS HAVING ADJUSTABLE JOYSTICK RETURN POSITIONS

(71) Applicant: Deere & Company, Moline, IL (US)

(72) Inventors: Brett S. Graham, Dubuque, IA (US); Alex R. Vandegrift, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 26 days.

(21) Appl. No.: 17/038,399

(22) Filed: Sep. 30, 2020

(65) Prior Publication Data
US 2021/0340728 A1    Nov. 4, 2021

Related U.S. Application Data

(60) Provisional application No. 63/019,083, filed on May 1, 2020.

(51) Int. Cl.
*E02F 9/20*     (2006.01)
*G05G 5/03*    (2008.04)
(Continued)

(52) U.S. Cl.
CPC .......... *E02F 9/2004* (2013.01); *E02F 9/2012* (2013.01); *E02F 9/2029* (2013.01);
(Continued)

(58) Field of Classification Search
None
See application file for complete search history.

(56) References Cited

U.S. PATENT DOCUMENTS 7,197,873 B1 *  4/2007  Windhorst ............ F16H 61/437
                                                                      60/487
8,066,567 B2  11/2011  Waggoner et al.
(Continued)

FOREIGN PATENT DOCUMENTS

CA        1203605 A      6/1986
CN     102027268 B     12/2013
(Continued)

OTHER PUBLICATIONS

Farzad Ahmadkhanlou, Design, Modeling and Control of Magnetorheological Fluid-Based Force Feedback Dampers for Telerobotic Systems, ResearchGate, https://www.researchgate.net/publication/251697638, Apr. 2008. (19 pages).

(Continued)

*Primary Examiner* — Vicky A Johnson
(74) *Attorney, Agent, or Firm* — Klintworth & Rozenblat IP LLP

(57) ABSTRACT

In embodiments, a work vehicle magnetorheological fluid (MRF) joystick system includes a joystick device. The joystick device includes, in turn, a base housing and a joystick, which is rotatable relative to the base housing and which is biased toward a joystick return position. An MRF joystick resistance mechanism is controllable to vary an MRF resistance force impeding movement of the joystick relative to the base housing, while a controller architecture is coupled to the MRF joystick resistance mechanism. The controller configured to: (i) selectively enable an operator adjustment of the joystick return position by a work vehicle operator; and (ii) when enabling the operator adjustment of the joystick return position, command the MRF joystick resistance mechanism to maintain the MRF resistance force at a predetermined level until the operator adjustment of the joystick return position is terminated.

20 Claims, 11 Drawing Sheets

(51) Int. Cl.
*G05G 9/047* (2006.01)
*E02F 9/26* (2006.01)
*G05G 5/12* (2006.01)
*G05G 5/02* (2006.01)
*F16F 9/53* (2006.01)
*G06F 3/01* (2006.01)
*E02F 9/24* (2006.01)
*G05G 1/015* (2008.04)
*G05G 1/04* (2006.01)
*F15B 13/01* (2006.01)
*G05G 5/05* (2006.01)
*E02F 3/32* (2006.01)
*E02F 3/76* (2006.01)

(52) U.S. Cl.
CPC ............... *E02F 9/24* (2013.01); *E02F 9/265* (2013.01); *F15B 13/01* (2013.01); *F16F 9/535* (2013.01); *G05G 1/015* (2013.01); *G05G 1/04* (2013.01); *G05G 5/02* (2013.01); *G05G 5/03* (2013.01); *G05G 5/05* (2013.01); *G05G 5/12* (2013.01); *G05G 9/047* (2013.01); *G06F 3/016* (2013.01); *E02F 3/32* (2013.01); *E02F 3/7609* (2013.01); *E02F 3/7636* (2013.01); *E02F 9/261* (2013.01); *G05G 2009/04751* (2013.01); *G05G 2009/04766* (2013.01); *G05G 2505/00* (2013.01)

(56) References Cited

U.S. PATENT DOCUMENTS

| | | | |
|---|---|---|---|
| 8,639,393 B2 | 1/2014 | Taylor et al. | |
| 8,972,125 B1 | 3/2015 | Elliott | |
| 9,141,126 B2* | 9/2015 | Hynes | G05G 1/01 |
| 9,181,676 B2 | 11/2015 | Meislahn et al. | |
| 9,341,258 B1* | 5/2016 | Templin | F16H 59/0278 |
| 9,771,705 B2 | 9/2017 | Horstman et al. | |
| 9,777,460 B2 | 10/2017 | Wuisan et al. | |
| 9,777,461 B2 | 10/2017 | Wuisan et al. | |
| 9,797,114 B2 | 10/2017 | Maifield et al. | |
| 10,061,343 B2 | 8/2018 | Fredrickson et al. | |
| 10,066,367 B1 | 9/2018 | Wang et al. | |
| 10,119,244 B2 | 11/2018 | Elkins | |
| 10,145,084 B2 | 12/2018 | Fredrickson | |
| 11,048,330 B2 | 6/2021 | Eck et al. | |
| 11,086,350 B2 | 8/2021 | Wakuda et al. | |
| 2001/0052893 A1 | 12/2001 | Jolly et al. | |
| 2003/0098196 A1* | 5/2003 | Yanaka | B62D 5/006 180/315 |
| 2004/0204811 A1 | 10/2004 | Huang et al. | |
| 2004/0221674 A1 | 11/2004 | Kornelson | |
| 2006/0197741 A1 | 9/2006 | Biggadike | |
| 2011/0005344 A1 | 1/2011 | Haevescher | |
| 2013/0229272 A1 | 9/2013 | Elliott | |
| 2016/0179128 A1 | 6/2016 | Guglielmo | |
| 2017/0073935 A1 | 3/2017 | Friend et al. | |
| 2018/0058039 A1 | 3/2018 | Fredrickson et al. | |
| 2019/0071119 A1 | 3/2019 | Takenaka et al. | |
| 2019/0210854 A1 | 7/2019 | Eck et al. | |
| 2019/0286237 A1 | 9/2019 | Eck et al. | |
| 2020/0041331 A1 | 2/2020 | Hoshino et al. | |
| 2020/0125132 A1* | 4/2020 | Wakuda | G05G 5/03 |
| 2021/0286431 A1 | 9/2021 | Eck et al. | |
| 2021/0340723 A1 | 11/2021 | Velde et al. | |
| 2021/0340724 A1 | 11/2021 | Kenkel et al. | |
| 2021/0340725 A1 | 11/2021 | Velde et al. | |
| 2021/0340728 A1 | 11/2021 | Graham et al. | |
| 2021/0341032 A1 | 11/2021 | Velde et al. | |
| 2021/0341033 A1 | 11/2021 | Breutzman et al. | |
| 2021/0341960 A1 | 11/2021 | Kenkel et al. | |

FOREIGN PATENT DOCUMENTS

| | | |
|---|---|---|
| CN | 112267516 A | 1/2021 |
| DE | 19848191 A1 | 4/2000 |
| DE | 102004017148 A1 | 1/2005 |
| DE | 102004041690 A1 | 3/2005 |
| DE | 112009003181 T5 | 1/2012 |
| DE | 102012203095 A1 | 9/2013 |
| DE | 112013001281 T5 | 7/2019 |
| DE | 102020104810 A1 | 2/2021 |
| JP | 2014174726 A | 9/2014 |
| KR | 20190074555 A | 6/2019 |
| WO | 9642078 A1 | 12/1996 |
| WO | WO2015009161 A1 | 1/2015 |

OTHER PUBLICATIONS

Deere & Company, John Deere Motor Grader Left Dual Joystick Controls Tutorial, https://www.youtube.com/watch?v=iYxPlxzD8g4&feature=youtu.be&t=25, Mar. 7, 2017. (2 pages).

MRF Damper, FMR-70S-403 Brochure, undated admitted prior art. (3 pages).

German Search Report issued in application No. DE102021203860.3 dated Jan. 28, 2022 (05 pages).

Non-Final Office Action issued in Utility U.S. Appl. No. 16/864,696 dated Sep. 16, 2021.

USPTO, Non-Final Office Action issued in Utility U.S. Appl. No. 17/002,052 dated Nov. 8, 2021.

German Search Report issued in application No. DE102021203807.7 dated Jan. 26, 2022 with English translation (11 pages).

German Search Report issued in application No. DE102021203189.7 dated Dec. 1, 2021 (04 pages).

German Search Report issued in application No. DE102021203343.1 dated Dec. 2, 2021 (05 pages).

German Search Report issued in application No. DE102021203250.8 dated Dec. 2, 2021 (04 pages).

German Search Report issued in application No. DE102021202960.4 dated Dec. 1, 2021 (04 pages).

German Search Report issued in application No. DE102021203367.9 dated Dec. 1, 2021 (05 pages).

USPTO, Non-Final Office Action issued in U.S. Appl. No. 16/916,800 dated Jun. 22, 2022.

USPTO, Non-Final Office Action issued in U.S. Appl. No. 16/864,749 dated Sep. 8, 2022.

* cited by examiner

WORK VEHICLE MAGNETORHEOLOGICAL FLUID JOYSTICK SYSTEMS HAVING ADJUSTABLE JOYSTICK RETURN POSITIONS

CROSS-REFERENCE TO RELATED APPLICATION(S)

This application claims priority to U.S. provisional application Ser. No. 63/019,083, filed with the United Stated Patent and Trademark Office on May 1, 2020.

STATEMENT OF FEDERALLY SPONSORED RESEARCH OR DEVELOPMENT

Not applicable.

FIELD OF THE DISCLOSURE

This disclosure relates to embodiments of a work vehicle magnetorheological fluid (MRF) joystick systems including at least one joystick biased toward a joystick return position, which can be adjusted to operator preference.

BACKGROUND OF THE DISCLOSURE

Joystick devices are commonly utilized to control various operational aspects of work vehicles employed within the construction, agriculture, forestry, and mining industries. For example, in the case of a work vehicle equipped with a boom assembly, an operator may utilize one or more joystick devices to control boom assembly movement and, therefore, movement of a tool or implement mounted to an outer terminal end of the boom assembly. Common examples of work vehicles having such joystick-controlled boom assemblies include excavators, feller bunchers, skidders, tractors (on which modular front end loader and backhoe attachments may be installed), tractor loaders, wheel loaders, and various compact loaders. Similarly, in the case of dozers, motor graders, and other work vehicles equipped with earth-moving blades, an operator may utilize one or more joysticks to control blade movement and positioning. Joystick devices are also often utilized to steer or otherwise control the directional movement of the work vehicle chassis in the case of motor graders, dozers, and certain loaders, such as skid steer loaders. Given the prevalence of joystick devices within work vehicles, taken in combination with the relatively challenging, dynamic environments in which work vehicles often operate, a continued demand exists for advancements in the design and function of work vehicle joystick systems, particularly to the extent that such advancements can improve the safety and efficiency of work vehicle operation.

SUMMARY OF THE DISCLOSURE

A work vehicle magnetorheological fluid (MRF) joystick system is disclosed for usage onboard a work vehicle. In embodiments, the work vehicle MRF joystick system includes a joystick device having a base housing and a joystick, which is rotatable relative to the base housing and which is biased toward a joystick return position. An MRF joystick resistance mechanism is controllable to vary an MRF resistance force impeding movement of the joystick relative to the base housing. A controller architecture is coupled to the MRF joystick resistance mechanism and is configured to: (i) selectively enable an operator adjustment of the joystick return position by a work vehicle operator; and (ii) when enabling the operator adjustment of the joystick return position, command the MRF joystick resistance mechanism to maintain the MRF resistance force at a predetermined level until the operator adjustment of the joystick return position is terminated.

In further embodiments, the work vehicle MRF joystick system includes a joystick device having a base housing and a joystick, which is rotatable relative to the base housing and which is biased toward a joystick return position. The work vehicle MRF joystick system further includes an MRF joystick resistance mechanism controllable to vary an MRF resistance force impeding movement of the joystick relative to the base housing, a joystick return position (JRP) locking mechanism external to the base housing, and a controller architecture coupled to the MRF joystick resistance mechanism and to the JRP locking mechanism. The JRP locking mechanism is movable between a locked state preventing adjustment of the joystick return position and an unlocked state permitting adjustment of the joystick return position. The controller architecture is configured to: (i) when receiving an operator adjustment of the joystick return position, command the MRF joystick resistance mechanism to generate a maximum MRF resistance force substantially preventing movement of the joystick relative to the base housing; and (ii) command the MRF joystick resistance mechanism to remove the maximum MRF resistance force when the operator adjustment of the joystick return position is terminated.

In other implementations, the work vehicle MRF joystick system includes a joystick device, an MRF joystick resistance mechanism, and a JRP locking mechanism. The joystick device includes, in turn, a base housing, a joystick rotatable relative to the base housing, a spring contained in the base housing and exerting a resilient bias force on the joystick urging the joystick toward a joystick return position, and an adjustable spring support having a first end portion mounted to the base housing and having a second end supporting the spring. The MRF joystick resistance mechanism is controllable to vary an MRF resistance force impeding movement of the joystick relative to the base housing. The JRP locking mechanism is at least partially contained in the base housing and is coupled to the adjustable spring support. The JRP locking mechanism is movable between a locked state preventing positional adjustment of the adjustable spring support and an unlocked state permitting positional adjustment of the adjustable spring support.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
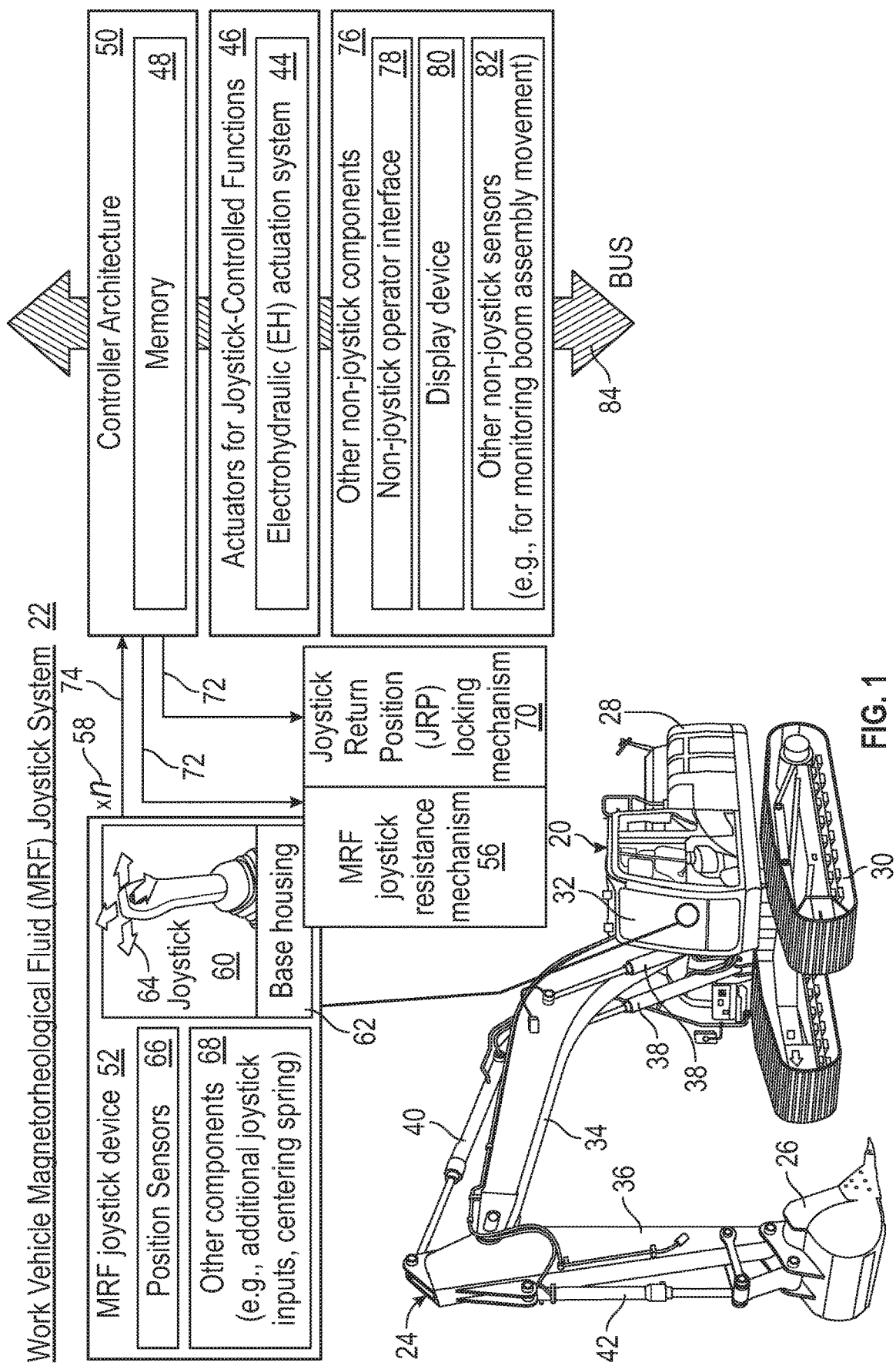
FIG. 1 is a schematic of an example magnetorheological fluid (MRF) joystick system onboard a work vehicle (here, an excavator) and having an adjustable joystick return position, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

Embodiments of a work vehicle magnetorheological fluid (MRF) joystick system include at least one joystick biased toward a joystick return position, which can be adjusted to operator preference. The MRF joystick system further includes a processing sub-system or "controller architecture," which is coupled to an MRF joystick resistance mechanism; that is, a mechanism, device, or damper containing a magnetorheological fluid and capable of modifying the rheology (viscosity) of the fluid through variations in the strength of an electromagnetic (EM) field to provide controlled adjustments to the resistive force impeding joystick motion in one or more degrees of freedom (DOFs). This resistive force is referred to herein as an "MRF resistance force," while the degree to which an MRF resistance force impedes joystick motion in a particular direction or combination of directions is referred to as the "joystick stiffness." Through the usage of such MRF technology, embodiments of the MRF joystick system can generate various tactile resistance effects perceptible to work vehicle operators, including the selective application of detents and continuous variations in the MRF resistance force inhibiting joystick motions in one or more directions. Further, in certain cases, a maximum MRF resistance force may be generated in an attempt to arrest certain joystick motions; or to limit the range of motion (ROM) of the joystick to a particular pattern or movement range. Regardless of the particular MRF effects or control schemes employed during work vehicle MRF joystick system operation, embodiments of the present disclosure leverage the unique MRF capabilities of the joystick device or devices contained in the MRF joystick system to provide an intuitive, manually-driven process for adjusting the joystick return position of a given joystick device to operator preference.

In addition to the above-mentioned components, embodiments of the work vehicle MRF joystick system also include at least one joystick return position (JRP) locking mechanism, which is movable between locked and unlocked states. In the locked state, the JRP locking mechanism prevents operator adjustment of the joystick return position of a given MRF joystick device. Conversely, in the unlocked state, the JRP locking mechanism enables operator adjustment of the joystick return position of the joystick device. The JRP locking mechanism may assume various forms for providing this function depending upon, for example, whether the JRP locking mechanism is integrated into the main casing or "base housing" of the joystick device or, instead, is externally-located relative to the base housing of the joystick device. When integrated into the base housing, the JRP locking mechanism may support one or more mechanical springs (or other bias elements) further contained within the base housing and coupled to a lower portion of the joystick. Collectively, the springs exert a cumulative bias force urging rotation of the joystick toward the operator-adjustable joystick return position. In one implementation, the JRP locking mechanism may include a hydraulic cylinder and a shutoff valve, which can be controlled by the controller architecture to selectively permit or prevent fluid flow between the hydraulic chambers of the cylinder. The hydraulic cylinder includes, in turn, cylinder body and a piston, which can freely translate relative to the cylinder body when fluid flow is permitted between the cylinder chambers. Jointly, the hydraulic cylinders and the springs may be referred to as "cylinder-spring pairs." While potentially including any practical number of cylinder-spring pairs, a given MRF joystick device will typically include one to four cylinder-spring pairs depending upon joystick device packaging, the number of DOFs in which the joystick can move, and other factors.

In the example above, a work vehicle operator may be permitted to adjust the joystick return position of an MRF joystick device utilizing the following process steps. First, the operator provides some form of input, as received by the controller architecture of the MRF joystick, initiating the JRP adjustment process. In response to this operator input, the controller architecture unlocks the JRP locking mechanism to permit an operator adjustment of the joystick return position; e.g., when the JRP locking mechanism includes at least one hydraulic cylinder and a corresponding shutoff valve, the controller architecture may command the shutoff valve to open or otherwise temporarily permit fluid flow between the cylinder chambers. This enables the piston of each cylinder to translate freely, while an operator grasps the joystick handle and rotates the joystick into a desired joystick return position. As the operator rotates the joystick in this manner, the spring included in each cylinder-spring pair deflects to exert a force on its supportive piston, which translates to a new position to zero-out the spring force and return the spring to a non-deflected state. After adjusting the joystick to a operator-adjusted joystick return position, the operator then enters additional input terminating the JRP adjustment process. Receiving this input, the controller architecture commands the JRP locking mechanism to relock; e.g., by commanding the shutoff valves to again close or otherwise prevent fluid flow between the cylinder chambers. The hydraulic cylinder pistons are arrested in their current translational positions as a result. Supported by the pistons, the bias springs now bias the joystick toward the newly-adjusted joystick return position during usage of the MRF joystick device.

In embodiments of the work vehicle MRF joystick system, the controller architecture may store JRP setting data in a computer-readable memory following each termination of the JRP adjustment process. The controller architecture may then recall the JRP setting data, as appropriate, to identify selected joystick positions at which to generate certain position-dependent MRF effects, such MRF detents encountered as the joystick is rotated relative to the base housing about one or more axes. Further, in embodiments in which the JRP locking mechanism is internal to the base housing, movement of the joystick return position from its default, non-modified, or "true center" setting may result in certain asymmetries in the range of motion (ROM) of the joystick. Such ROM asymmetries may be relatively minor and, therefore, not compensated in embodiments of the MRF joystick system. In other instances, however, the MRF joystick system may perform certain actions to correct such symmetries by, for example, intentionally shortening the joystick ROM in one or more selected directions. For example, in certain embodiments of the work vehicle MRF joystick system, the controller architecture may generate MRF motion stops at appropriate locations to equalize the ROM of the joystick when rotated in opposing directions about a given axis beginning from an operator-adjusted joystick return position, as further discussed below in connection with FIGS. 10 and 11.

In other implementations of the work vehicle MRF joystick system, the JRP locking mechanism may be external to the base housing of an MRF joystick device. In this case, the base housing may be joined to an adjacent (e.g., surrounding) support structure, which is positioned adjacent an operator station or seat of the work vehicle; e.g., the support structure may be integrated into or otherwise jointed to console or armrest of the work vehicle in at least some instances. In embodiments, a multi-DOF (e.g., gimbal) coupling may be provided between the base housing and support structure to enable rotation of the MRF joystick device relative to the support structure about two perpendicular axes over a limited angular ROM. The JRP locking mechanism may be mounted between the base housing and the support structure, and may assume any form suitable for preventing such relative movement between the base housing and the support structure when the JRP locking mechanism is locked. In certain cases, the JRP locking mechanism may be a manually-actuated locking device, such as one or more set screws, a clamp device, or a similar device that can be turned or otherwise physically manipulated by an operator to selectively lock and unlock the JRP locking mechanism. This provides a structurally robust, cost-effective locking interface, with the tradeoff of a potential decrease in operator ease-of-use. In more complex embodiments, the JRP locking mechanism can be an actuated rotary or linear device, which can be remotely locked and unlocked by the controller architecture. For example, in embodiments, the JRP locking mechanism can contain one or more hydraulic cylinders mechanically coupled between the base housing and the support structure, as well as one or more valves (e.g., an MRF or non-MRF shutoff valves) controllable by the controller architecture to selectively permit or prevent fluid flow between the chambers of the hydraulic cylinders.

In implementations in which the JRP locking mechanism is external to the base housing, the following process may be carried-out by the controller architecture of the MRF joystick system to enable JRP adjustment by a work vehicle operator. First, the controller architecture may receive an operator input command requesting entry into a JRP adjustment mode. In response to this input command, the controller architecture causes the MRF joystick resistance mechanism to apply a maximum or peak MRF resistance force preventing joystick rotation relative to the base housing. In implementations in which the JRP locking mechanism is non-manual, the controller architecture may further unlock the JRP locking mechanism in conjunction with commanding the MRF joystick resistance mechanism to generate a maximum MRF resistance force. This combination of actions permits the operator to rotate the grasp the joystick handle and rotate the joystick into a desired joystick return position, while the base housing rotates in conjunction with the joystick relative to the support structure. When subsequently receiving input indicating an operator desire to conclude or terminate the JRP adjustment process, the controller architecture controls the MRF joystick resistance mechanism to remove the maximum MRF resistance force. If applicable, the controller architecture further commands the JRP locking mechanism to return to a locked state, again preventing rotation of the base housing relative to support structure. In this manner, the joystick return position is adjusted through variations in the angular orientation of the MRF joystick device relative to the support structure itself. An operator may then return to normal usage of the MRF joystick device, with the joystick now biased toward the operator-adjusted joystick return position.

When the JRP locking mechanism is internal to the base housing, the MRF joystick device may be imparted with a relatively compact, structurally-robust design. Additionally, integration of the JRP locking mechanism into the base housing may enable the JRP locking mechanism to share certain components (e.g., a common MRF valve or valve bank) with the MRF joystick resistance mechanism when, for example, the JRP locking mechanism contains one or more hydraulic cylinders conducting a magnetorheological fluid. Comparatively, when the JRP locking mechanism is external to the base housing, greater design flexibility may be provided and ROM symmetry (and desired MRF detent positioning, if applicable) may be maintained independently of (separate and apart from) JRP adjustments to the MRF joystick device. Both configurations are consequently associated with different advantages. Regardless of whether the JRP locking mechanism is internal or external to the base housing, the work vehicle MRF joystick system leverages the unique MRF capabilities of a given joystick device to provide an intuitive, manually-driven process for adjusting the joystick return position of the joystick device to operator preference. Work vehicle operators can thus readily select and re-select ideal joystick return positions to maximize operator comfort and reduce ergonomic stressors, which may otherwise occur during prolonged periods of joystick interaction.

A first example embodiment of a work vehicle MRF joystick system, which permits operator adjustment of a joystick return position and which includes a JRP locking mechanism external to the base housing of an MRF joystick device, is described below in conjunction with FIGS. 1-6. In the below-described example embodiment, the MRF joystick system is principally discussed in the context of a particular type of work vehicle, namely, an excavator. Additionally, in the following example, the MRF joystick system includes two MRF joystick devices, which each include a joystick rotatable about two perpendicular axes and which are utilized to control movement of the excavator boom assembly and a tool or implement attached thereto. The following example notwithstanding, the MRF joystick system may include a greater or lesser number of joysticks in further embodiments, with each joystick device movable in any number of DOFs and along any suitable motion pattern; e.g., in alternative implementations, a given joystick device may be rotatable about a single axis or, perhaps, movable along a limited (e.g., H-shaped) track or motion pattern. Moreover, the below-described MRF joystick system can be deployed on wide range of work vehicles including various joystick-controlled functions, additional examples of which are discussed below in connection with FIG. 7. A second example embodiment of an MRF joystick system further permitting operator JRP adjustment, while containing a JRP locking mechanism internal to the base housing of a MRF joystick device, is further discussed below in connection with FIGS. 8-11.

Example MRF Joystick System Containing at Least One Joystick Device Having an Adjustable Joystick Return Position Referring initially to FIG. 1, an example work vehicle (here, an excavator 20) equipped with a work vehicle MRF joystick system 22 is presented. In addition to the MRF joystick system 22, the excavator 20 includes a boom assembly 24 terminating in a tool or implement, such a bucket 26. Various other implements can be interchanged with the bucket 26 and attached to the terminal end of the boom assembly 24 including, for example, other buckets, grapples, and hydraulic hammers. The excavator 20 features a body or chassis 28, a tracked undercarriage 30 supporting the chassis 28, and a cabin 32 located at forward portion of the chassis 28 and enclosing an operator station. The excavator boom assembly 24 extends from the chassis 28 and contains, as principal structural components, an inner or proximal boom 34 (hereafter, "the hoist boom 34"), an outer or distal boom 36 (hereafter, "the dipperstick 36"), and a number of hydraulic cylinders 38, 40, 42. The hydraulic cylinders 38, 40, 42 include, in turn, two hoist cylinders 38, a dipperstick cylinder 40, and a bucket cylinder 42. Extension and retraction of the hoist cylinders 38 rotates the hoist boom 34 about a first pivot joint at which the hoist boom 34 is joined to the excavator chassis 28, here at location adjacent (to the right of) the cabin 32. Extension and retraction of the dipperstick cylinder 40 rotates the dipperstick 36 about a second pivot joint at which the dipperstick 36 is joined to the hoist boom 34. Finally, extension and retraction of the bucket cylinder 42 rotates or "curls" the excavator bucket 26 about a third pivot joint at which the bucket 26 is joined to the dipperstick 36.

The hydraulic cylinders 38, 40, 42 are included in an electrohydraulic (EH) actuation system 44, which is encompassed by a box 46 entitled "actuators for joystick-controlled functions" in FIG. 1. Movements of the excavator boom assembly 24 are controlled utilizing at least one joystick located within the excavator cabin 32 and included in the MRF joystick system 22. Specifically, an operator may utilize the joystick or joysticks included in the MRF joystick system 22 to control the extension and retraction of the hydraulic cylinders 38, 40, 42, as well as to control the swing action of the boom assembly 24 via rotation of the excavator chassis 28 relative to the tracked undercarriage 30. The depicted EH actuation system 44 also contains various other non-illustrated hydraulic components, which may include flow lines (e.g., flexible hoses), check or relief valves, pumps, a, fittings, filters, and the like. Additionally, the EH actuation system 44 contains electronic valve actuators and flow control valves, such as spool-type multi-way valves, which can be modulated to regulate the flow of pressurized hydraulic fluid to and from the hydraulic cylinders 38, 40, 42. This stated, the particular construction or architecture of the EH actuation system 44 is largely inconsequential to embodiments of the present disclosure, providing that the below-described controller architecture 50 is capable of controlling movement of the boom assembly 24 via commands transmitted to selected ones of the actuators 46 effectuating the joystick controlled functions of the excavator 20.

As schematically illustrated in an upper left portion of FIG. 1, the work vehicle MRF joystick system 22 contains one or more MRF joystick devices 52, 54. As appearing herein, the term "MRF joystick device" refers to an operator input device including at least one joystick or control lever, the movement of which can be impeded by a variable resistance force or "stiffness force" applied utilizing an MRF joystick resistance mechanism of the type described herein. While one such MRF joystick device 52 is schematically shown in FIG. 1 for clarity, the MRF joystick system 22 can include any practical number of joystick devices, as indicated by symbol 58. In the case of the example excavator 20, the MRF joystick system 22 will typically include two joystick devices; e.g., joystick devices 52, 54 described below in connection with FIG. 2. The manner in which two such joystick devices 52, 54 may be utilized to control movement of the excavator boom assembly 24 is further discussed below. First, however, a general discussion of the joystick device 52, as schematically illustrated in FIG. 1, is provided to establish a general framework in which embodiments of the present disclosure may be better understood.

As schematically illustrated in FIG. 1, the MRF joystick device 52 includes a joystick 60 mounted to a lower support structure or base housing 62. The joystick 60 is movable relative to the base housing 62 in at least one DOF and may be rotatable relative to the base housing 62 about one or more axes. In the depicted embodiment, and as indicated by arrows 64, the joystick 60 of the MRF joystick device 52 is rotatable relative to the base housing 62 about two perpendicular axes and will be described below as such. The MRF joystick device 52 includes one or more joystick position sensors 66 for monitoring the current position and movement of the joystick 60 relative to the base housing 62. Various other components 68 may also be included in the MRF joystick device 52 including buttons, dials, switches, or other manual input features, which may be located on the joystick 60 itself, located on the base housing 62, or a combination thereof. Spring elements (gas or mechanical), magnets, or fluid dampers may be incorporated into the joystick device 52 to provide a desired rate of return to a home or joystick return position of the joystick (described below), as well as to fine-tune the desired feel of the joystick 60 perceived by an operator when interacting with the MRF joystick device 52.

An MRF joystick resistance mechanism 56 is at least partially integrated into the base housing 62 of the MRF joystick device 52. The MRF joystick resistance mechanism 56 is controllable by the controller architecture 50 of the work vehicle MRF joystick system 22 to adjust the MRF resistance force and, therefore, joystick stiffness resisting joystick motion relative to the base housing 62 in at least one DOF. In this regard, during operation of the MRF joystick system 22, the controller architecture 50 may selectively command the MRF joystick resistance mechanism 56 to increase the joystick stiffness impeding joystick rotation about a particular axis or combination of axes. As discussed more fully below, the controller architecture 50 may command the MRF joystick resistance mechanism 56 to provide a range of effects or modifications to joystick behavior by selectively increasing the strength of an EM field in which a magnetorheological fluid contained in the mechanism 56 is at least partially immersed. For example, in embodiments, the controller architecture 50 may command the MRF joystick resistance mechanism to generate localized regions of increased resistance (herein, "MRF detents"), which are encountered as a joystick is moved into a particular position. When applied, the MRF detents can be generated to exert an MRF resistive force sufficient to overcome the bias or "centering" force exerted on the joystick, in which case the MRF detents may be referred to specifically as "hold detents." In other instances, an MRF detent may be generated at a lower MRF resistive force, which is perceptible to the work vehicle operator manipulating the joystick, while insufficient to prevent return of the joystick to the joystick return position solely under the influence of the joystick's centering force. MRF detents of this latter type are referred to herein as "feel detents." A generalized example of one manner in which the MRF joystick resistance mechanism 56 may be realized is described below in connection with FIGS. 3 and 4.

The MRF joystick system 22 further includes a JRP locking mechanism 70, which is associated with MRF joystick device 52 and movable between locked and unlocked states. In the locked state, the JRP locking mechanism 70 prevents operator adjustment of the joystick return position of the MRF joystick device 52. In the unlocked state, the JRP locking mechanism 70 permits adjustment of the joystick return position by a current operator of the excavator 20. The JRP locking mechanism 70 may contain any number, type, and arrangement of devices for providing this function. In certain embodiments, the JRP locking mechanism 70 may be external to the base housing 62 of the MRF joystick device 52, as discussed in connection with FIGS. 5 and 6. Alternatively, in other instances, the JRP locking mechanism 70 may be internal to (integrated into) the base housing 62 of the MRF joystick device 52, as discussed in connection with FIGS. 8 and 9. In certain cases, the JRP locking mechanism 70 may contain one or more operator-actuated, purely mechanical devices, particularly when the JRP locking mechanism 70 is external to the base housing 62 of the MRF joystick device 52. More commonly, however, the JRP locking mechanism 70 includes one or more actuated components, which are remotely controlled by the controller architecture 50 during the course of the JRP adjustment process. In this latter regard, arrows 72 represent data connections (wired or wireless) from the controller architecture 50 to the JRP locking mechanism 70 and to the MRF joystick resistance mechanism 56 in the schematic of FIG. 1. Similarly, an arrow 74 denotes the data connection or connections (wired or wireless) from the position sensors 66 and possibly other components (e.g., external buttons, dials, or other operator inputs) of the MRF joystick device 52 to the controller architecture 50.

Embodiments of the MRF joystick system 22 may further include any number of other non-joystick components 76 in addition to those previously described. The additional non joystick components 76 may include an operator interface 78 (distinct from the MRF joystick device 52), a display device 80 located in the excavator cabin 32, and various other types of non joystick sensors 82. The operator interface 78, in particular, can include any number and type of non-joystick input devices for receiving operator input, such as buttons, switches, knobs, and similar manual inputs external to the MRF joystick device 52. Such input devices included in the operator interface 78 can also include cursor-type input devices, such as a trackball or joystick, for interacting with a graphical user interface (GUI) generated on the display device 80. The display device 80 may be located within the cabin 32 and may assume the form of any image-generating device on which visual alerts and other information may be visually presented. The display device 80 may also generate a GUI for receiving operator input or may include other inputs (e.g., buttons or switches) for receiving operator input, which may be pertinent to the controller architecture 50 when performing the below-described processes. In certain instances, the display device 80 may also have touch input capabilities. Finally, the MRF joystick system 22 can include various other non-joystick sensors 82. For example, the non-joystick sensors 82 can include sensors or data sources for detecting and monitoring vehicle motion, such as Global Navigation Satellite System (GNSS) modules, such as Global Positioning System (GPS) modules, for monitoring excavator position and motion states.

As further depicted in FIG. 1, the controller architecture 50 is associated with a memory 48 and may communicate with the various illustrated components over any number of wired data connections, wireless data connections, or any combination thereof; e.g., as generically illustrated, the controller architecture 50 may receive data from various components over a centralized vehicle or a controller area network (CAN) bus 84. The term "controller architecture," as appearing herein, is utilized in a non-limiting sense to generally refer to the processing subsystem of a work vehicle MRF joystick system, such as the example MRF joystick system 22. Accordingly, the controller architecture 50 can encompass or may be associated with any practical number of processors, individual controllers, computer-readable memories, power supplies, storage devices, interface cards, and other standardized components. In many instances, the controller architecture 50 may include a local controller directly associated with the joystick interface and other controllers located within the operator station enclosed by the cabin 32, with the local controller communicating with other controllers onboard the excavator 20 as needed. The controller architecture 50 may also include or cooperate with any number of firmware and software programs or computer-readable instructions designed to carry-out the various process tasks, calculations, and control functions described herein. Such computer-readable instructions may be stored within a non-volatile sector of the memory 48 associated with (accessible to) the controller architecture 50. While generically illustrated in FIG. 1 as a single block, the memory 48 can encompass any number and type of storage media suitable for storing computer-readable code or instructions, as well as other data utilized to support the operation of the MRF joystick system 22; e.g., the below-described JRP setting data and data related to any MRF effects (e.g., the location of MRF detents) desirably generated during operation of the joystick device(s).

Figure 2:
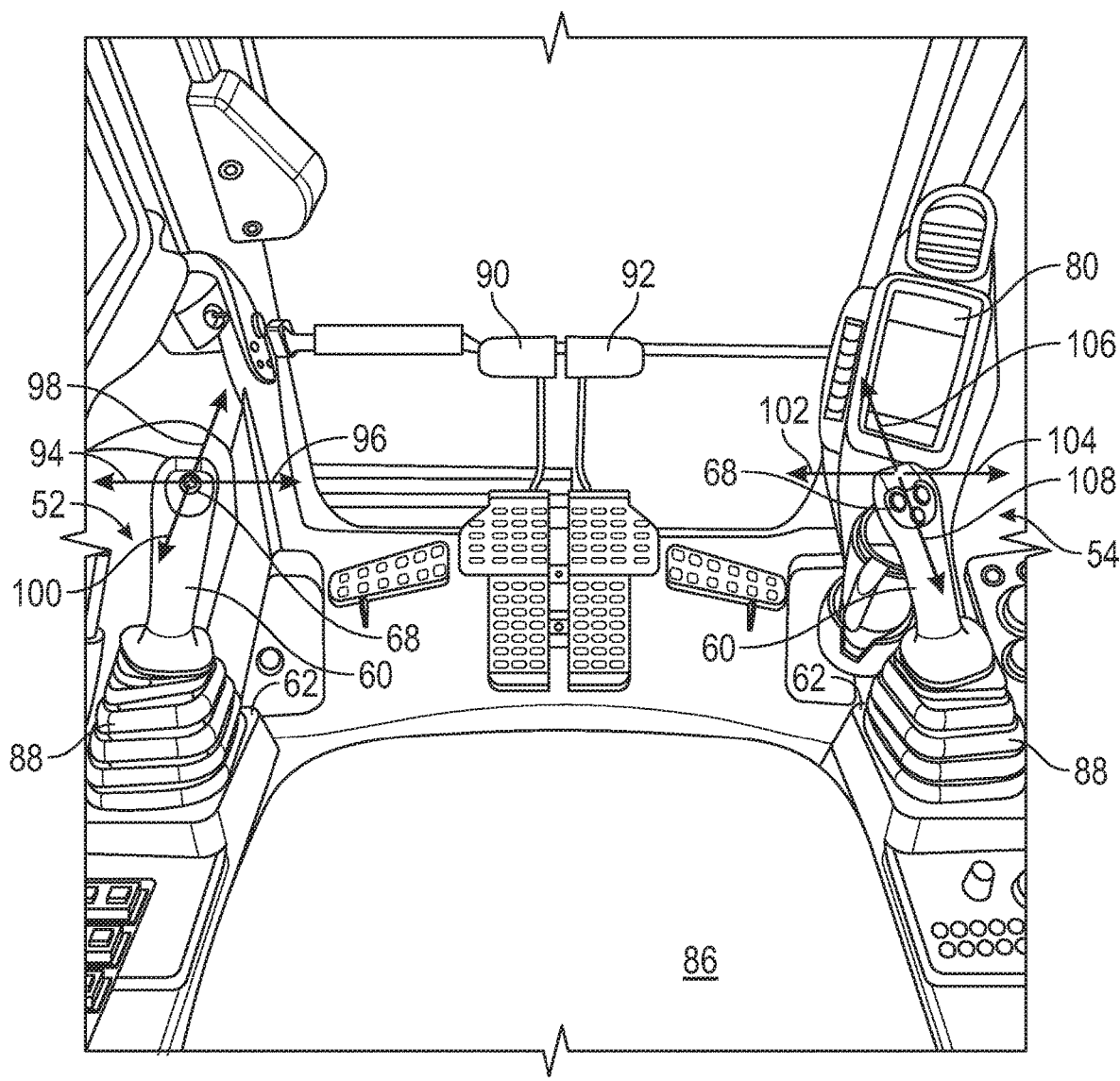
FIG. 2 is a perspective view from within the excavator cabin shown in FIG. 1 illustrating two joystick devices, which may be included in the example MRF joystick system and utilized by an operator to control movement of the excavator boom assembly.

Discussing the joystick configuration or layout of the excavator 20 in greater detail, the number of joystick devices included in the MRF joystick system 22, and the structural aspects and function of such joysticks, will vary amongst embodiments. As previously mentioned, although only a single joystick device 52 is schematically shown in FIG. 1, the MRF joystick system 22 will typically two joystick devices 52, 54 supporting excavator boom assembly control. Further illustrating this point, FIG. 2 provides a perspective view from within the excavator cabin 32 and depicting two MRF joystick devices 52, 54 suitably included in embodiments of the MRF joystick system 22. As can be seen, the MRF joystick devices 52, 54 are positioned on opposing sides of an operator seat 86 such that an operator, using both hands, can concurrently manipulate the left MRF joystick device 52 and the right joystick device 54 with relative ease. Carrying forward the reference numerals introduced above in connection with FIG. 1, each joystick device 52, 54 includes a joystick 60 mounted to a lower support structure or base housing 62 for rotation relative to the base housing 62 about two perpendicular axes. The joystick devices 52, 54 also each include a flexible cover or boot 88 joined between a lower portion of the joysticks 60 and their respective base housings 62. Additional joystick inputs are also provided on each joystick 60 in the form of thumb-accessible buttons and, perhaps, as other non-illustrated manual inputs (e.g., buttons, dials, and or switches) provided on the base housings 62. Other notable features of the excavator 20 shown in FIG. 2 include the previously-mentioned display device 80 and pedal/control lever mechanisms 90, 92 for controlling the respective movement of the right and left tracks of the tracked undercarriage 30.

Different control schemes can be utilized to translate movement of the joysticks 60 included in the joystick devices 52, 54 to corresponding movement of the excavator boom assembly 24. In many instances, the excavator 20 will support boom assembly control in either (and often allow switching between) a "backhoe control" or "SAE control" pattern and an "International Standard Organization" or "ISO" control pattern. In the case of the backhoe control pattern, movement of the left joystick 60 to the operator's left (arrow 94) swings the excavator boom assembly 24 in a leftward direction (corresponding to counter-clockwise rotation of the chassis 28 relative to the tracked undercarriage 30), movement of the left joystick 60 to the operator's right (arrow 96) swings the boom assembly 24 in a rightward direction (corresponding to clockwise rotation of the chassis 28 relative to the tracked undercarriage 30), movement of the left joystick 60 in a forward direction (arrow 98) lowers the hoist boom 34, and movement of the left joystick 60 in an aft or rearward direction (arrow 100) raises the hoist boom 34. Also, in the case of the backhoe control pattern, movement of the right joystick 60 to the left (arrow 102) curls the bucket 26 inwardly, movement of the right joystick 60 to the right (arrow 104) uncurls or "opens" the bucket 26, movement of the right joystick 60 in a forward direction (arrow 106) rotates the dipperstick 36 outwardly, and movement of the right joystick 60 in an aft direction (arrow 108) rotates the dipperstick 36 inwardly. Comparatively, in the case of an ISO control pattern, the joystick motions for the swing commands and the bucket curl commands are unchanged, while the joystick mappings of the hoist boom and dipperstick are reversed. Thus, in the ISO control pattern, forward and aft movement of the left joystick 60 controls the dipperstick rotation in the previously described manner, while forward and aft movement of the right joystick 60 controls motion (raising and lowering) of the hoist boom 34 in the manner described above.

Figure 3:
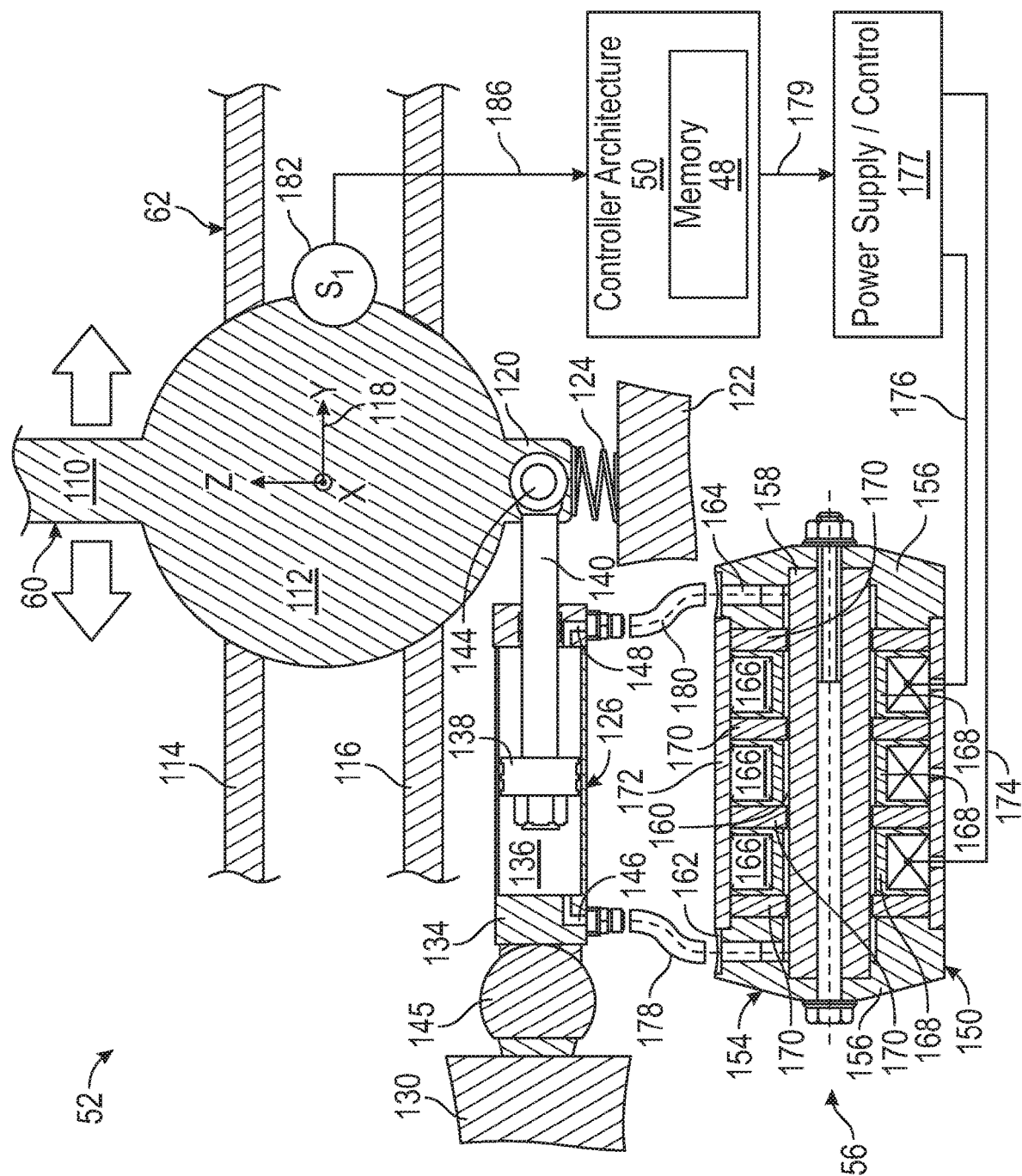
FIGS. 3 and 4 are cross-sectional schematics of the example MRF joystick system, as partially shown and taken along perpendicular section planes through a joystick included in a joystick device, illustrating one possible construction of the MRF joystick system.
Figure 4:
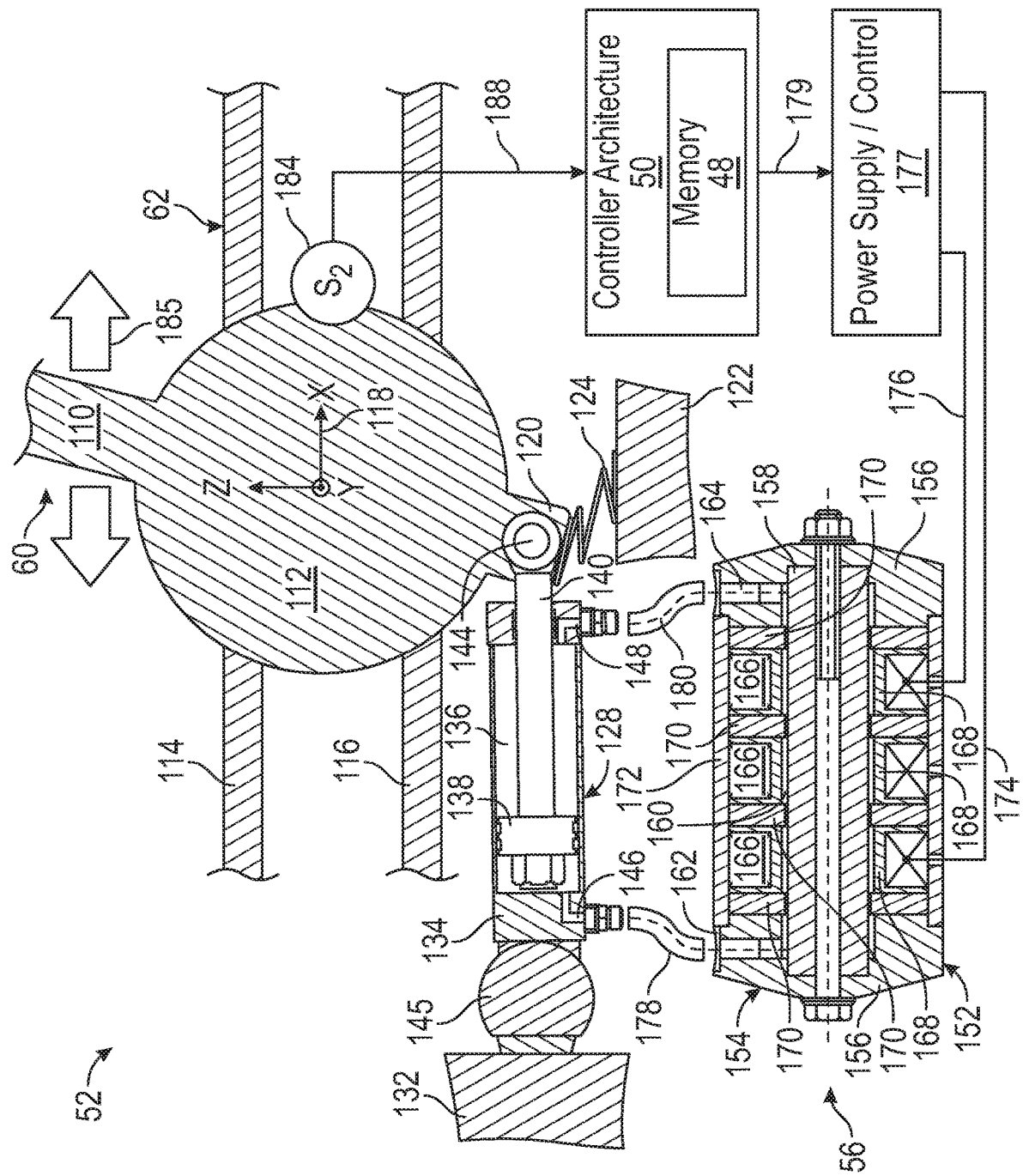

Turning now to FIGS. 3 and 4, an example construction of the MRF joystick device 52 and the MRF joystick resistance mechanism 56 is represented by two simplified cross-sectional schematics. While these drawing figures illustrate a single MRF joystick device (i.e., the MRF joystick device 52), the following description is equally applicable to the other MRF joystick device 54 included in the example MRF joystick system 22. The following description is provided by way of non-limiting example only, noting that numerous different joystick designs incorporating or functionally cooperating with MRF joystick resistance mechanisms are possible. The particular composition of the magnetorheological fluid largely is also inconsequential to embodiments of the present disclosure, providing that meaningful variations in the rheological properties (viscosity) of the magnetorheological fluid occur in conjunction with controlled variations in EM field strength, as described below. For completeness, however, is noted that one magnetorheological fluid composition well-suited for usage in embodiments of the present disclosure contains magnetically-permeable (e.g., carbonyl iron) particles dispersed in a carrier fluid, which is predominately composed of an oil or an alcohol (e.g., glycol) by weight. Such magnetically-permeable particles may have an average diameter (or other maximum cross-sectional dimension if the particles possess a non-spherical (e.g., oblong) shape) in the micron range; e.g., in one embodiment, spherical magnetically-permeable particles are used having an average diameter between one and ten microns. Various other additives, such as dispersants or thinners, may also be included in the magnetorheological fluid to fine-tune the properties thereof.

Referring now to the example joystick construction shown in FIGS. 3 and 4, and again carrying forward the previously-introduced reference numerals as appropriate, the MRF joystick device 52 includes a joystick 60 having at least two distinct portions or structural regions: an upper handle 110 (only a simplified, lower portion of which is shown in the drawing figures) and a lower, generally spherical base portion 112 (hereafter, the "generally spherical base 112"). The generally spherical base 112 of the joystick 60 is captured between two walls 114, 116 of the base housing 62, which may extend substantially parallel to one another to form an upper portion of the base housing 62. Vertically-aligned central openings are provided through the housing walls 114, 116, with the respective diameters of the central openings dimensioned to be less than the diameter of the generally spherical base 112. The spacing or vertical offset between the walls 114, 116 is further selected such that the bulk of generally spherical base 112 is captured between the vertically-spaced housing walls 114, 116 to form a ball-and-socket type joint. This permits rotation of the joystick 60 relative to the base housing 62 about two perpendicular axes, which correspond to the X- and Y-axes of a coordinate legend 118 appearing in FIGS. 3 and 4; while generally preventing translational movement of the joystick 60 along the X-, Y-, and Z-axes of the coordinate legend 118. In further embodiments, various other mechanical arrangements can be employed to mount a joystick to a base housing, while allowing rotation of the joystick about two perpendicular axis, such as a gimbal arrangement. In less complex embodiments, a pivot or pin joint may be provided to permit rotation of the joystick 60 relative to the base housing 62 about a single axis.

The joystick 60 of the MRF joystick device 52 further includes a stinger or lower joystick extension 120, which projects from the generally spherical base 112 in a direction opposite the joystick handle 110. The lower joystick extension 120 is coupled to a static attachment point of the base housing 62 by a single return or bias spring 124 in the illustrated schematic; here noting that such an arrangement is simplified for the purposes of illustration and more complex spring bias arrangements (or other joystick biasing mechanisms, if present) will typically be employed in actual embodiments of the MRF joystick device 52. When the joystick 60 is displaced from the joystick return position shown in FIG. 3, the bias spring 124 deflects as shown in FIG. 4 to urge return of the joystick 60 to the home position (FIG. 3). Consequently, as an example, after rotation into the position shown in FIG. 4, the joystick 60 will return to a neutral or home position (herein, the "joystick return position") shown in FIG. 3 under the influence of the bias spring 124 should the work vehicle operator subsequently release the joystick handle 110. Further discussion of the manner in which the joystick 60 may be biased toward a joystick return position, which is adjustable to operator preference, is provided below in connection with FIGS. 5-11.

The example MRF joystick resistance mechanism 56 includes a first and second MRF cylinders 126, 128 shown in FIGS. 3 and 4, respectively. The first MRF cylinder 126 (FIG. 3) is mechanically joined between the lower joystick extension 120 and a partially-shown, static attachment point or infrastructure feature 130 of the base housing 62. Similarly, the second MRF cylinder 128 (FIG. 4) is mechanically joined between the lower joystick extension 120 and a static attachment point 132 of the base housing 62, with the MRF cylinder 128 rotated relative to the MRF cylinder 126 by approximately 90 degrees about the Z-axis of the coordinate legend 118. Due to this structural configuration, the MRF cylinder 126 (FIG. 3) is controllable to selectively resist rotation of the joystick 60 about the X-axis of coordinate legend 118, while the MRF cylinder 128 (FIG. 4) is controllable to selectively resist rotation of the joystick 60 about the Y-axis of coordinate legend 118. Additionally, both MRF cylinders 126, 128 can be jointly controlled to selectively resist rotation of the joystick 60 about any axis falling between the X- and Y-axes and extending within the X-Y plane. In other embodiments, a different MRF cylinder configuration may be utilized and include a greater or lesser number of MRF cylinders; e.g., in implementations in which it is desirable to selectively resist rotation of joystick 60 about only the X-axis or only the Y-axis, or in implementations in which joystick 60 is only rotatable about a single axis, a single MRF cylinder or a pair of antagonistic cylinders may be employed. Finally, although not shown in the simplified schematics, any number of additional components can be included in or associated with the MRF cylinders 126, 128 in further implementations. Such additional components may include sensors for monitoring the stroke of the cylinders 126, 128 if desirably known to, for example, track joystick position in lieu of the below-described joystick sensors 182, 184.

The MRF cylinders 126, 128 each include a cylinder body 134 to which a piston 138, 140 is slidably mounted. Each cylinder body 134 contains a cylindrical cavity or bore 136 in which a head 138 of one of the pistons 138, 140 is mounted for translational movement along the longitudinal axis or centerline of the cylinder body 134. About its outer periphery, each piston head 138 is fitted with one or more dynamic seals (e.g., O-rings) to sealingly engaging the interior surfaces of the cylinder body 134, thereby separating the bore 136 into two antagonistic variable-volume hydraulic chambers. The pistons 138, 140 also each include an elongated piston rod 140, which projects from the piston head 138 toward the lower joystick extension 120 of the joystick 60. The piston rod 140 extends through an end cap 142 affixed over the open end of the cylinder body 134 (again, engaging any number of seals) for attachment to the lower joystick extension 120 at a joystick attachment point 144. In the illustrated example, the joystick attachment points 144 assume the form of pin or pivot joints; however, in other embodiments, more complex joints (e.g., spherical joints) may be employed to form this mechanical coupling. Opposite the joystick attachment points 144, the opposing end of the MRF cylinders 126, 128 are mounted to the respective static attachment points 130, 132 via spherical joints 145. Finally, hydraulic ports 146, 148 are further provided in opposing end portions of each MRF cylinder 126, 128 to allow the inflow and outflow of magnetorheological fluid in conjunction with translational movement or stroking of the pistons 138, 140 along the respective longitudinal axes of the MRF cylinders 126, 128.

The MRF cylinders 126, 128 are fluidly interconnected with corresponding MRF values 150, 152, respectively, via flow line connections 178, 180. As is the case with the MRF cylinders 126, 128, the MRF valves 150, 152 are presented as identical in the illustrated example, but may vary in further implementations. Although referred to as "valves" by common terminology (considering, in particular, that the MRF valves 150, 152 function to control magnetorheological fluid flow), it will be observed that the MRF valves 150, 152 lack valve elements and other moving mechanical parts in the instant example. As a beneficial corollary, the MRF valves 150, 152 provide fail safe operation in that, in the unlikely event of MRF valve failure, magnetorheological fluid flow is still permitted through the MRF valves 150, 152 with relatively little resistance. Consequently, should either or both of the MRF valves 150, 152 fail for any reason, the ability of MRF joystick resistance mechanism 56 to apply resistance forces restricting or inhibiting joystick motion may be compromised; however, the joystick 60 will remain freely rotatable about the X- and Y-axes in a manner similar to a traditional, non-MRF joystick system, and the MRF joystick device 52 will remain capable of controlling the excavator boom assembly 24 as typical.

In the depicted embodiment, the MRF valves 150, 152 each include a valve housing 154, which contains end caps 156 affixed over opposing ends of an elongated cylinder core 158. A generally annular or tubular flow passage 160 extends around the cylinder core 158 and between two fluid ports 162, 164, which are provided through the opposing end caps 156. The annular flow passage 160 is surrounded by (extends through) a number of EM inductor coils 166 (hereafter, "EM coils 166"), which are wound around paramagnetic holders 168 and interspersed with a number of axially- or longitudinally-spaced ferrite rings 170. A tubular shroud 172 surrounds this assembly, while a number of leads are provided through the shroud 172 to facilitate electrical interconnection with the housed EM coils 166. Two such leads, and the corresponding electrical connections to a power supply and control source 177, are schematically represented in FIGS. 3 and 4 by lines 174, 176. As indicated by arrows 179, the controller architecture 50 is operably coupled to the power supply and control source 177 in a manner enabling the controller architecture 50 to control the source 177 to vary the current supplied to or the voltage applied across the EM coils 166 during operation of the MRF joystick system 22. This structural arrangement thus allows the controller architecture 50 to command or control the MRF joystick resistance mechanism 56 to vary the strength of an EM field generated by the EM coils 166. The annular flow passage 160 extends through the EM coils 166 (and may be substantially co-axial therewith) such that the magnetorheological fluid passes through the center the EM field when as the magnetorheological fluid is conducted through the MRF valves 150, 152.

The fluid ports 162, 164 of the MRF valves 150, 152 are fluidly connected to the ports 146, 148 of the corresponding the MRF cylinders 126, 128 by the above-mentioned conduits or flow line connections 178, 180, respectively. The flow line connections 178, 180 may be, for example, lengths of flexible tubing having sufficient slack to accommodate any movement of the MRF cylinders 126, 128 occurring in conjunction with rotation of the joystick 60. Consider, in this regard, the example scenario of FIG. 4. In this example, an operator has moved the joystick handle 110 in an operator input direction (indicated by arrow 185) such that the joystick 60 rotates about the Y-axis of coordinate legend 118 in a clockwise direction. In combination with this joystick motion, the MRF cylinder 128 rotates about the spherical joint 145 to tilt slightly upward as shown. Also, along with this operator-controlled joystick motion, the piston 138, 140 contained in the MRF cylinder 128 retracts such that the piston head 138 moves to the left in FIG. 4 (toward the attachment point 132). The translation movement of the piston 138, 140 forces magnetorheological fluid flow through the MRF valve 152 to accommodate the volumetric decrease of the chamber on the left of the piston head 138 and the corresponding volumetric increase of the chamber to the right of the piston head 138. Consequently, at any point during such an operator-controlled joystick rotation, the controller architecture 50 can vary the current supplied to or the voltage across the EM coils 166 to vary the force resisting magnetorheological fluid flow through the MRF valve 152 and thereby achieve a desired MRF resistance force resisting further stroking of the piston 138, 140.

Given the responsiveness of MRF joystick resistance mechanism 56, the controller architecture 50 can control the resistance mechanism 56 to only briefly apply such an MRF resistance force, to increase the strength of the MRF resistance force in a predefined manner (e.g., in a gradual or stepped manner) with increasing piston displacement, or to provide various other resistance effects (e.g., a tactile detent or pulsating effect), as discussed in detail below. The controller architecture 50 can likewise control the MRF joystick resistance mechanism 56 to selectively provided such resistance effects as the piston 138, 140 included in the MRF valve 150 strokes in conjunction with rotation of the joystick 60 about the X-axis of coordinate legend 118. Moreover, the MRF joystick resistance mechanism 56 may be capable of independently varying the EM field strength generated by the EM coils 166 within the MRF valves 150, 152 to allow independent control of the MRF resistance forces inhibiting joystick rotation about the X- and Y-axes of coordinate legend 118.

The MRF joystick device 52 may further contain one or more joystick position sensors 182, 184 (e.g., optical or non-optical sensors or transformers) for monitoring the position or movement of the joystick 60 relative to the base housing 62. In the illustrated example, specifically, the MRF joystick device 52 includes a first joystick position sensor 182 (FIG. 3) for monitoring rotation of the joystick 60 about the X-axis of coordinate legend 118, and a second joystick position sensor 184 (FIG. 4) for monitoring rotation of the joystick 60 about the Y-axis of coordinate legend 118. The data connections between the joystick position sensors 182, 184 and the controller architecture 50 are represented by lines 186, 188, respectively. In further implementations, the MRF joystick device 52 can include various other non-illustrated components, as can the MRF joystick resistance mechanism 56. Such components can include operator inputs and corresponding electrical connections provided on the joystick 60 or the base housing 62, AFF motors, and pressure and/or flow rate sensors included in the flow circuit of the MRF joystick resistance mechanism 56, as appropriate, to best suit a particular application or usage.

As previously emphasized, the above-described embodiment of the MRF joystick device 52 is provided by way of non-limiting example only. In alternative implementations, the construction of the joystick 60 can differ in various respects. So too may the MRF joystick resistance mechanism 56 differ in further embodiments relative to the example shown in FIGS. 3 and 4, providing that the MRF joystick resistance mechanism 56 is controllable by the controller architecture 50 to selectively apply a resistance force (through changes in the rheology of a magnetorheological fluid) inhibiting movement of a joystick relative to a base housing in at least one DOF. In further realizations, EM inductor coils similar or identical to the EM coils 166 may be directly integrated into the MRF cylinders 126, 128 to provide the desired controllable MRF resistance effect. In such realizations, magnetorheological fluid flow between the variable volume chambers within a given MRF cylinder 126, 128 may be permitted via the provision of one or more orifices through the piston head 138, by providing an annulus or slight annular gap around the piston head 138 and the interior surfaces of the cylinder body 134, or by providing flow passages through the cylinder body 134 or sleeve itself. Advantageously, such a configuration may impart the MRF joystick resistance mechanism with a relatively compact, integrated design. Comparatively, the usage of one or more external MRF valves, such as the MRF valves 150, 152 (FIGS. 3 and 4), may facilitate cost-effective manufacture and allow the usage of commercially-available modular components in at least some instances.

In still other implementations, the design of the MRF joystick device may permit the magnetorheological fluid to envelop and act directly upon a lower portion of the joystick 60 itself, such as the spherical base 112 in the case of the joystick 60, with EM coils positioned around the lower portion of the joystick and surrounding the magnetological fluid body. In such embodiments, the spherical base 112 may be provided with ribs, grooves, or similar topological features to promote displacement of the magnetorheological fluid in conjunction with joystick rotation, with energization of the EM coils increasing the viscosity of the magnetorheological fluid to impede fluid flow through restricted flow passages provided about the spherical base 112 or, perhaps, due to sheering of the magnetorheological fluid in conjunction with joystick rotation. Various other designs are also possible in further embodiments of the MRF joystick system 22.

Regardless of the particular design of the MRF joystick resistance mechanism 56, the usage of MRF technology to selectively generate a variable MRF resistance force or joystick stiffness inhibiting (resisting or preventing) unintended joystick motions provides several advantages. As a primary advantage, the MRF joystick resistance mechanism 56 (and MRF joystick resistance mechanism generally) are highly responsive and can effectuate desired changes in EM field strength, in the rheology of the magnetorheological fluid, and ultimately in the MRF-applied joystick stiffness inhibiting joystick motions in highly abbreviated time periods; e.g., time periods on the order of 1 millisecond in certain instances. Correspondingly, the MRF joystick resistance mechanism 56 may enable the MRF resistance force to be removed (or at least greatly reduced) with an equal rapidity by quickly reducing current flow through the EM coils and allowing the rheology of the magnetorheological fluid (e.g., fluid viscosity) to revert to its normal, unstimulated state. The controller architecture 50 can further control the MRF joystick resistance mechanism 56 to generate the MRF resistance force to have a continuous range of strengths or intensities, within limits, through corresponding changes in the strength of the EM field generated utilizing the EM coils 166. Beneficially, the MRF joystick resistance mechanism 56 can provide reliable, essentially noiseless operation over extended time periods. Additionally, the magnetorheological fluid can be formulated to be non-toxic in nature, such as when the magnetorheological fluid contains carbonyl iron-based particles dispersed in an alcohol-based or oil-based carrier fluid, as previously described. Finally, as a still further advantage, the above-described configuration of the MRF joystick resistance mechanism 56 allows the MRF joystick system 22 to selectively generate a first resistance force or joystick stiffness deterring joystick rotation about a first axis (e.g., the X-axis of coordinate legend 118 in FIGS. 3 and 4), while further selectively generating a second resistance force or joystick stiffness deterring joystick rotation about a second axis (e.g., the Y-axis of coordinate legend 118) independently of the first resistance force (joystick stiffness); that is, such that the first and second resistance forces have different magnitudes, as desired.

Figure 5:
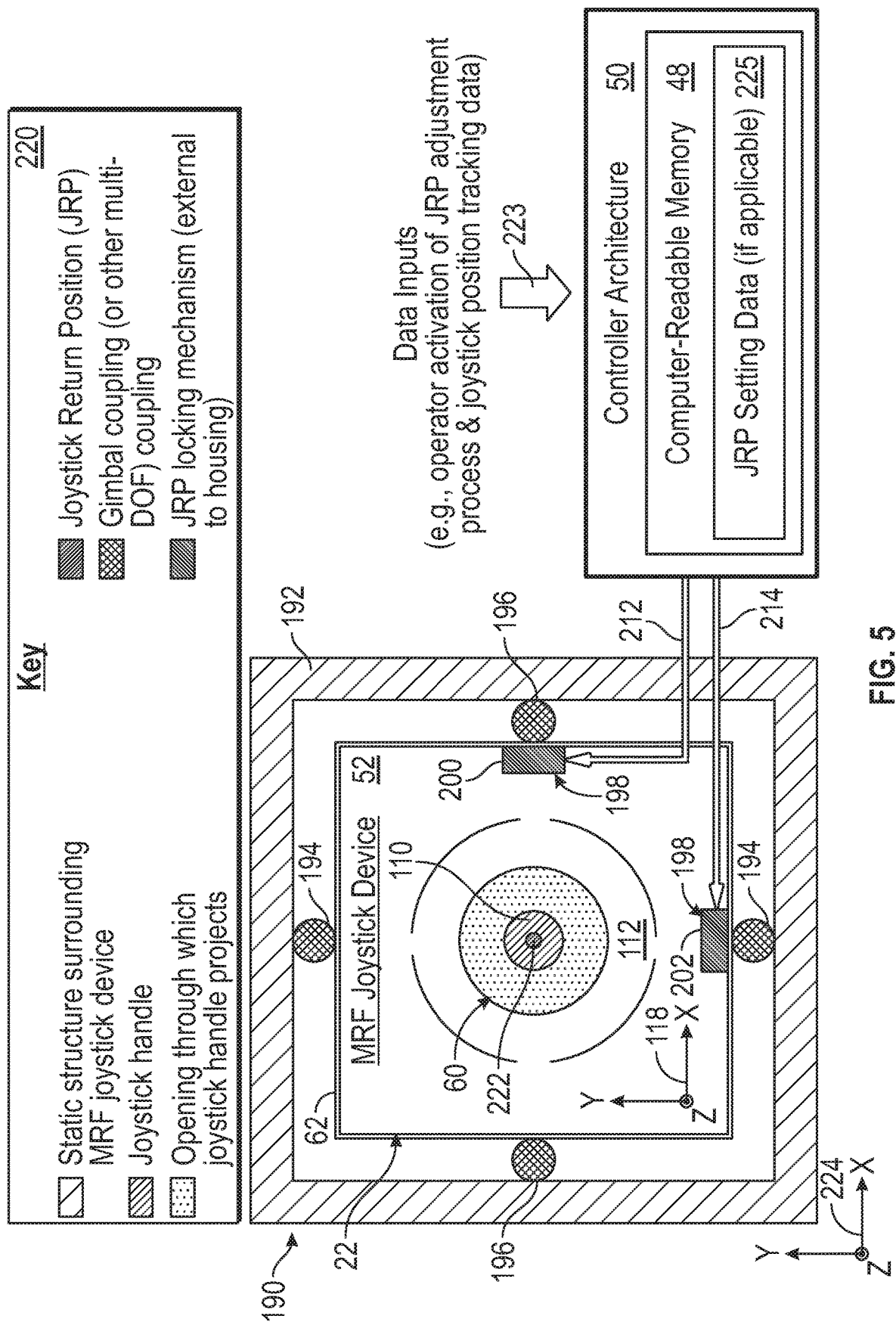
FIG. 5 is a schematic of the MRF joystick device shown in FIGS. 3 and 4 in an example implementation in which the joystick device includes a JRP locking mechanism external to the base housing of a joystick device.

Turning now to FIG. 5, a schematic of a joystick support assembly 190 including the example MRF joystick device 52 is shown in a simplified top-down view. In addition to the MRF joystick device 52, the joystick support assembly 190 further includes a support structure 192. The support structure 192 is positioned adjacent, and may partially surround, the base housing 62 of the MRF joystick device 52. The support structure 192 can be any structure or structural assembly suitable for mounting the MRF joystick device 52 at a desired location within a work vehicle; e.g., within the cabin 32 of the excavator 20 in the present example. In certain embodiments, the support structure 192 may be integrated into or otherwise attached to an armrest, a console, or a similar interior region of the work vehicle located adjacent an operator's seat and in convenient reach of the operator. The base housing 62 of the joystick device 52 is joined to the support structure 192 via a coupling 194, 196, which permits limited rotation of the base housing 62 relative to the support structure 192 in at least one DOF. In this particular example, the coupling 194, 196 assumes the form of a gimbal coupling permitting rotation of the base housing 62 relative to the support structure 192 about two perpendicular axes over a limited angular range. The gimbal coupling 194, 196 includes a first pin joint pair 194 permitting limited rotation of the base housing 62 relative to the support structure 192 about the Y-axis of coordinate legend 118, as well as a second pin joint pair 196 permitting limited rotation of the base housing 62 about the X-axis of coordinate legend 118.

A JRP locking mechanism 198 is positioned between the base housing 62 of the MRF joystick device 52 and the surrounding support structure 192; e.g., the JRP locking mechanism 198 may be positioned underneath or at an elevation below the base housing 62 of the MRF joystick device 52, as schematically indicated in FIG. 5. The JPR locking mechanism 198 is movable between a locked state (in which the JRP locking mechanism 198 normally resides) and an unlocked state. In the locked state, the JRP locking mechanism 198 prevents adjustment of the joystick return position by rotationally affixing the base housing 62 to the support structure 192. Conversely, in the unlocked state, the JRP locking mechanism 198 enables rotational movement between the base housing 62 of the MRF joystick device and the support structure 192, to the extent allowed by the gimbal coupling 194, 196. This permits operator adjustment of the joystick return position through modifications to the angular orientation of the base housing 62 relative to the support structure 192, as discussed below.

In certain embodiments, the JRP locking mechanism 198 may include one or more manually-actuated locking devices, which can be manipulated by an operator to transition the JRP locking mechanism between locked and unlocked states. Examples of such manual locking mechanisms include set screws, clamp devices, spring-loaded plungers (which may engage into divots or other recesses provided on the exterior of the base housing 62), and similar devices. In other embodiments, the JRP locking mechanism 198 contains one or more actuated devices, which can be controlled by the controller architecture 50 to transition the JRP locking mechanism 198 between locked and unlocked states. For example, in certain embodiments, the JRP locking mechanism 198 can include one or more rotary or linear devices, such as miniature clutch packs integrated into the gimbal couplings 194, 196, which can be remotely engaged and disengaged by the controller architecture 50. In other implementations, the JRP locking mechanism 198 may contain one or more linear devices, which are mounted between the base housing 62 and the support structure 192 such that rotation of the base housing 62 can occur exclusively in conjunction with extension and retraction of the linear devices. For example, in this latter regard, the JRP locking mechanism 198 can include one or more hydraulic cylinders, which can freely translate when fluid flow is permitted between the chambers of the cylinders. One or more shutoff valves may further be fluidly interconnected with the cylinders and operably coupled to the controller architecture 50. Jointly, such hydraulic cylinders and shutoff valves are referred to herein as "lockable piston devices," and the potential positioning of two such lockable cylinder devices 200, 202 beneath the base housing 62 is schematically identified in FIG. 5.

The term "hydraulic fluid," as appearing herein, is defined to encompass both non-magnetorheological and magnetorheological fluids, which flow between the variable-volume chambers of hydraulic cylinders (and similar hydraulic devices) during operation of the MRF joystick system. Similarly, the term "hydraulic cylinder" is utilized herein in reference to a device (regardless of form factor) containing one or more hydraulic chambers and a translating member (piston), the linear movement of which drives or is driven by hydraulic fluid flow into or out of the cylinder chambers. Finally, as indicated above, the term "valve" refers to a device controllable to regulate the flow of a hydraulic fluid, whether magnetorheological or non-magnetorheological in nature, through the body or flow passage of the valve. In embodiments in which a valve controls MRF flow through the body of valve through variations in a magnetic field affecting the properties (viscosity) of the magnetorheological fluid, the valve may be specifically referred to as an "MRF valve." For ease of reference, such an MRF valve may still be referred as "moved" into a particular position (e.g., a shutoff position) when controlled to regulate MRF flow in a desired manner, with the understanding that (as previously described) an MRF valve may lack a movable valve element in a strict sense. Finally, the term "shutoff valve," as appearing herein, refers to a valve capable of selectively preventing, or at least significantly impeding, hydraulic fluid flow through the valve body.

Figure 6:
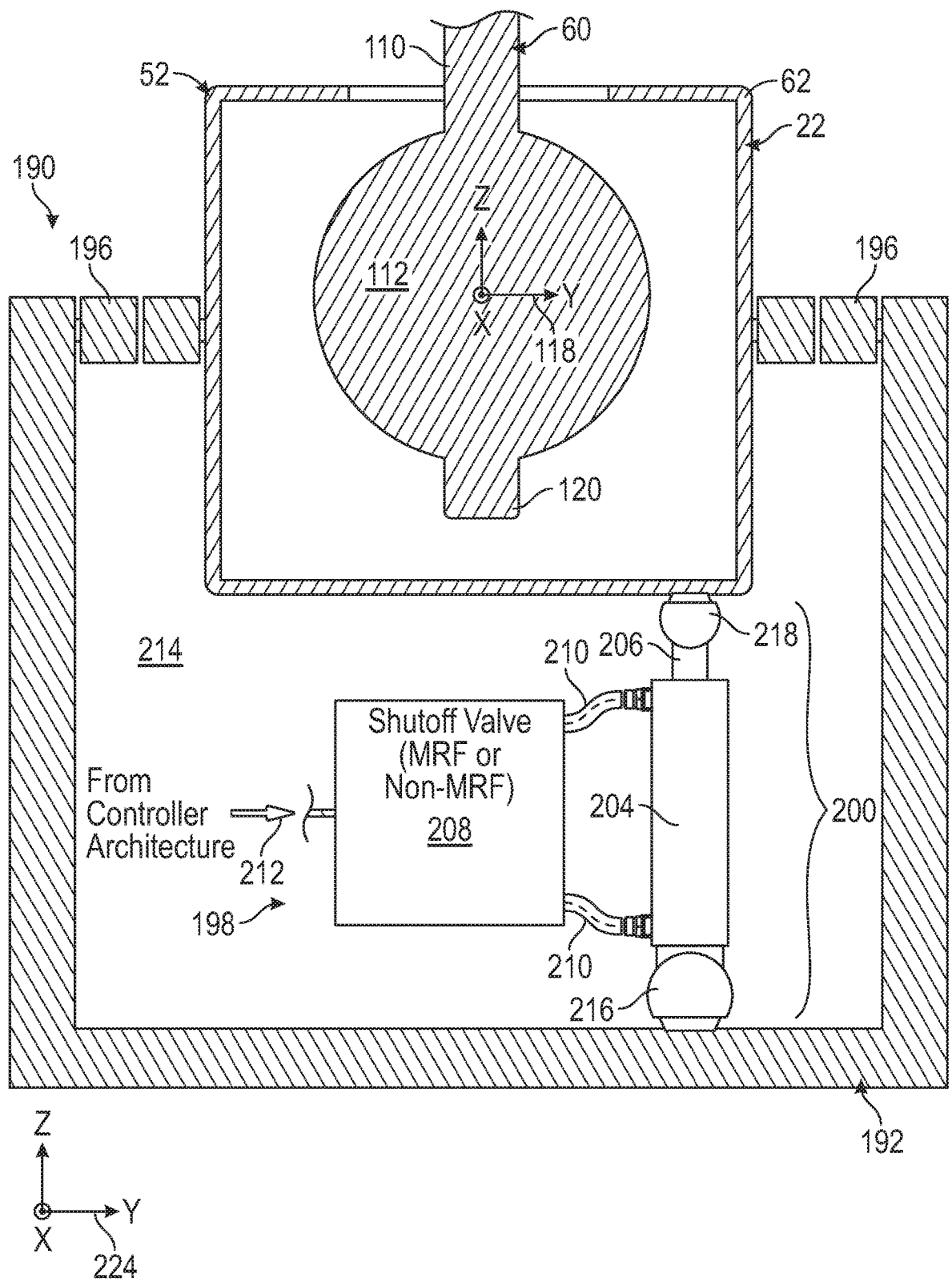
FIG. 6 is a simplified cross-sectional schematic view of the MRF joystick device shown in FIG. 5 illustrating an example hydraulic cylinder and shutoff valve, which may be included in embodiments of the JRP locking mechanism.

FIG. 6 further schematically illustrates the joystick support assembly 190 and the MRF joystick device 52 in a cross-sectional view, as taken along a section plane parallel to the X-Y plane of the coordinate legend 118 and extending through the joystick 60. Referring jointly to FIGS. 5 and 6, the JRP locking mechanism 198 includes a first lockable cylinder device 200 and a second lockable cylinder device 202. The first lockable cylinder device 200 is shown in greater detail in the schematic of FIG. 6. While the second lockable cylinder device 202 is not shown in FIG. 6, the lockable cylinder devices 200, 202 are substantially identical in the illustrated example; thus, the following description is equally applicable to the second lockable cylinder device 202. Each lockable cylinder device 200, 202 includes a hydraulic cylinder 204, 206 and an associated shutoff valve 208. The shutoff valve 208 is fluidly interconnected with its associated hydraulic cylinder 204, 206 via a number of flow lines 210; and the electronic components of the shutoff valve 208 (an actuator in the case of a non-MRF valve or EM coils in the case of a MRF valve) are further coupled to the controller architecture 50, or to a power supply controlled by the controller architecture 50, via one or more electrical connections 212. For the purposes of the following description, each of the lockable cylinder devices 202, 204 is described as fluidly interconnected with a separate shutoff valve 208; however, in further embodiments, the lockable cylinder devices 200, 202 may share a common shutoff valve, which can be moved into a shutoff position to concurrently prevent fluid flow between the chambers of the hydraulic cylinders 204, 206 and thereby lock the cylinder pistons 206 in a desirable translational position.

The hydraulic cylinders 204, 206 each include a cylinder body 204 and a piston 206, which can translate relative to the cylinder body 204. As included in the first lockable cylinder device 200, and as shown most clearly in FIG. 6, the first lockable cylinder device 200 is mounted between a lower portion of the base housing 62 and the floor of the support structure 192. Specifically, the hydraulic cylinder 204, 206 is housed within a cavity 214 of the support structure 190, with the lower end portion of the cylinder body 204 mounted to the support structure 192 by a first spherical joint coupling 216, and the outer terminal end of the piston 206 joined to the base housing 62 by a second spherical joint coupling 218. In other implementations, a different mounting interface may be utilized, providing that the hydraulic cylinder 204, 206 is capable of tilting or otherwise moving to accommodate changes in the angular orientation of the base housing 62 of the MRF joystick device 52 relative to the support structure 192. In this regard, and as previously discussed, the gimbal couplings 194, 196 permit rotation of the base housing 62 about the X- and Y-axes of coordinate legend 118 when the JRP locking mechanism 198 is in an unlocked state. The gimbal couplings 194, 196 may also be positioned such that adjustments in the angular orientation of the base housing 62 relative to the support structure 192 occur about a centerpoint or origin substantially coincident with the centerpoint or origin of joystick rotation (the origin of coordinate legend 118 in FIG. 6); however, this need not be the case in all embodiments. A similar mounting scheme may be likewise provided for the hydraulic cylinder 204, 206 included in the other lockable cylinder device 202 shown in FIG. 5.

The controller architecture 50 of the MRF joystick system 22 (FIG. 1) can control the shutoff valves 208 to selectively permit or prevent fluid flow between the hydraulic chambers of the hydraulic cylinders 204, 206 included in each lockable cylinder device 200, 202. Each shutoff valve 208 may be a non-MRF valve, such as a solenoid-actuated spool or stopper valve, when regulating the flow of a non-magnetorheological hydraulic fluid. Alternatively, the shutoff valve 208 may be an MRF valve (e.g., similar to or substantially identical to the MRF valves 56 described above in connection with FIGS. 3 and 4) in implementations in which a magnetorheological fluid is conducted through the valves 208 when flowing between chambers of the hydraulic cylinders 204, 206. In implementations in which the shutoff valves 208 are MRF valves, the shutoff valves 208 may be combined with the above-described MRF valves 56 as a single unit or valve bank for design simplification in certain instances. In other embodiments, the shutoff valves 208 may be separate MRF valves; or replaced with non-MRF shutoff valves containing valve elements, which are moved between open and closed positions by actuators under command of the controller architecture 50. Further, while the JRP locking mechanism 198 is implemented utilizing lockable cylinder devices 202, 204 in the present example, it will be appreciated that other types of linear devices capable of being selectively locked in a given translational position by the controller architecture 50 can be substituted for the lockable cylinder devices 202, 204 in further embodiments.

During normal or standard usage of the MRF joystick device 52, the controller architecture 50 commands the shutoff valves 208 to move into a shutoff position or otherwise prevent fluid flow between the chambers of the hydraulic cylinders 204, 206. This prevents translation of the pistons 206 included in the hydraulic cylinders 204, 206, which, in turn, prohibits rotation of the base housing 62 relative to the surrounding support structure 192. To subsequently place the JRP locking mechanism 198 in its unlocked state, the controller architecture 50 commands the shutoff valves 208 to open (or to otherwise permit fluid flow between the chambers of the hydraulic cylinders 204, 206), thereby freeing the pistons 206 of the hydraulic cylinders 204, 206 to translate in conjunction with rotation of the base housing 62 relative to the support structure 192. Consequently, when the JRP locking mechanism 198 is unlocked by the controller architecture 50, operator adjustments of the angular orientation of the base housing 62 of the MRF joystick device 52 relative to the support structure 192 are enabled, at least to the extent permitted by the gimbal coupling 194, 196. In at least some embodiments, the controller architecture 50 facilitates operator adjustments of the angular positioning or orientation of the base housing 62 relative to the support structure 192 by commanding the MRF joystick resistance mechanism 56 to apply a MRF resistance force at a level sufficient to prevent movement of the joystick 60 relative to the base housing 62; herein referred to as a "maximum" or "peak" MRF resistance force. The application of such a maximum MRF resistance force effectively locks or affixes the joystick 60 to the base housing 62, which enables an operator to readily adjust the angular orientation of the base housing 62 relative to the support structure 192 by simply grasping and manipulating the handle 110 of the joystick 60 as desired.

As identified by a key 220 appearing in an upper portion of FIG. 5, the current joystick return position of the MRF joystick device 52 is represented by a first cross-hatched marker 222. In the case of the MRF joystick device 52 is which the joystick 60 is capable of rotating relative to the base housing 62 about two perpendicular axes, the joystick return position is an angular position or orientation toward which the joystick 60 is biased to return. As shown most clearly in FIG. 6, the base housing 62 of the MRF joystick device 52 is not tilted or angled relative to the support structure 192 in the illustrated example. This may be appreciated by comparing the angular orientation of the coordinate legend 118 (here, denoting the joystick's frame of reference) to a second coordinate legend 224, which appears in a lower portion of FIG. 6 and which is representative of the frame of reference for the support structure 192. In the illustrated example in which the joystick return position of the MRF joystick device 52 is in a default, non-adjusted, or "true center" position, the Z-axes of coordinate legends 118, 224 extend in parallel; e.g., upward in the illustrated orientation and, perhaps, such that the Z-axis of coordinate legend 118 (and, correspondingly, the joystick handle 110) extends substantially in an upright direction. When the base housing 62 is rotated into a new angular position relative to the support structure 192, the Z-axis of the joystick coordinate legend 118 will differ from the Z-axis of support structure coordinate legend 224 by some angular deviation. The joystick return position will likewise vary in conjunction with changes in the angular orientation of the base housing 62 (coordinate legend 118) relative to the support structure 192 (coordinate legend 224).

In the present embodiment in which the JRP locking mechanism 198 is external to the base housing 62 of the MRF joystick device 52, the following process may be carried-out by the controller architecture 50 to enable JRP adjustment by a work vehicle operator. First, as indicated an arrow 223 (FIG. 5), the controller architecture 50 receives operator input initiating an adjustment of the joystick return position of the MRF joystick device 52. Such operator input may be received via manual actuation of a physical input, such as a button or switch, provided on the MRF joystick device 52. As an arbitrary example, in one possible approach, a work vehicle operator may press and a hold a button located on or adjacent the MRF joystick device 52 (e.g., on an upper portion of the joystick handle 110 or on an upper surface of the base housing 62) enabling operator adjustment of the joystick return position of the MRF joystick device 52. The operator may then release the button (or press the button a second time) to terminate or complete the JRP adjustment process, when so desired. In other implementations, a work vehicle operator may provide input initiating the JRP adjustment process in another manner, such as by interacting with a GUI generated on display device 80 to select an on-screen option enabling the joystick return position to be adjusted to operator preference. Such a GUI may also permit other MRF-related aspects of the MRF joystick device 52 to be adjusted to operator preference, such as the force at which the below-described MRF detents are generated.

In response to receipt of operator input initiating the JRP adjustment process, the controller architecture 50 commands the MRF joystick resistance mechanism 56 to apply a maximum or peak MRF resistance force at a level sufficient to prevent (or at least substantially deter) joystick rotation relative to the base housing 62. In embodiments in which the JRP locking mechanism 198 is non-manual in nature, the controller architecture 50 further commands the JRP locking mechanism 198 to unlock in conjunction with maximum MRF resistance force generation by the MRF joystick resistance mechanism 56. In the present example, and as described above, the controller architecture 50 unlocks the JRP locking mechanism 198 by commanding the shutoff valves 208 to move into an open position or to otherwise temporarily permit fluid flow between the opposing hydraulic chambers of the cylinders 204, 206. Specifically, when the shutoff valves 208 are non-MRF valves, the controller architecture 50 commands associated valve actuators to move the valve elements into closed positions, which block hydraulic fluid flow through the valve bodies and between the cylinder chambers. When the shutoff valves 208 instead assume the form of MRF valves, the controller architecture 50 adjusts the power supplied to the EM coils within the valves 208 to reduce the intensity of the EM field (or to cease generating EM fields altogether) to permit magnetorheological fluid flow through the valve bodies with relatively little flow resistance. With fluid flow now permitted between the opposing chambers of the hydraulic cylinders 204, 206, the pistons 206 of the cylinders 204, 206 can freely translate in conjunction with angular displacements of the base housing 62 relative to the support structure 192. A work vehicle operator grasping the handle 110 of the joystick 60 can thus rotate the joystick 60, and therefore the base housing 62, into any desired angular position or orientation relative to the support structure 192 permitted by the gimbal coupling 194, 196. This results in corresponding adjustments to the joystick return position of the MRF joystick device 52 as the angular orientation of the base housing 62 is adjusted or modified in this manner.

After rotating the joystick handle 110 into the operator-adjusted joystick return position, the operator provides input to the controller architecture 50 terminating the JRP adjustment process. When receiving this operator input, the controller architecture 50 commands the JRP locking mechanism 198 to revert to the locked state, thereby preventing further rotation of the base housing 62 relative to the support structure 192. In the illustrated example, the controller architecture 50 re-locks the JRP locking mechanism 198 by returning the shutoff valves 208 to a closed or shutoff position (when the shutoff valves 208 are non-MRF valves) or by causing the EM coils within the shutoff valves 208 to again generate an EM field of sufficient intensity to substantially prevent the fluid flow through the valve bodies (when the shutoff valves 208 are implemented as MRF valves). Once again in a locked state, the JRP locking mechanism 198 prohibits rotation of the base housing 62 relative to the support structure 192, thereby securing the base housing 62 and, therefore, the joystick return position in the newly-selected angular orientations. Concurrently with or shortly after returning the JRP locking mechanism 198 to a locked state, the controller architecture 50 further commands the MRF joystick resistance mechanism 56 to cease generation of the maximum MRF resistance force. The work vehicle operator is consequently permitted to again rotate the joystick 60 relative to the base housing 62 about the X- and Y-axes of coordinate legend 118, while the base housing 62 remains affixed to the support structure 192. Normal usage of the MRF joystick device 52 may be resumed, with the joystick 60 now biased toward the newly-selected joystick return position.

In certain embodiments, the controller architecture 50 of the MRF joystick system 22 may store JRP setting data 225 (FIG. 5) within the computer-readable memory 48 following the JRP adjustment process. The JRP setting data 225 may identify the operator-adjusted joystick return position, which can be stored as coordinates, as an angular deviation from the non-modified joystick return position, or in another manner. Additionally, in certain embodiments, the controller architecture 50 may store data in the memory 48 associating a unique operator identification data with each JRP setting. This, in turn, may allow the MRF joystick system 22 to automatically impart a given MRF joystick device (e.g., the MRF joystick device 52) with the stored joystick position setting in certain embodiments upon recognizing a particular work vehicle operator; e.g., following login of the operator utilizing a unique pin. The foregoing statement is applicable in embodiment in which the MRF joystick device 22 possesses force feedback capabilities or is otherwise capable of independently moving a joystick between different JRP settings. In other implementations, the controller architecture 50 may not store such JRP setting data 225 in the computer-readable memory 48 for such automatic adjustment purposes. However, JRP setting data may still be usefully stored in the computer-readable memory 48 in alternative embodiments in which the JRP locking mechanism is internal to the base housing 62 of the MRF joystick device 42, as discussed below in connection with FIGS. 8-11.

Figure 7:
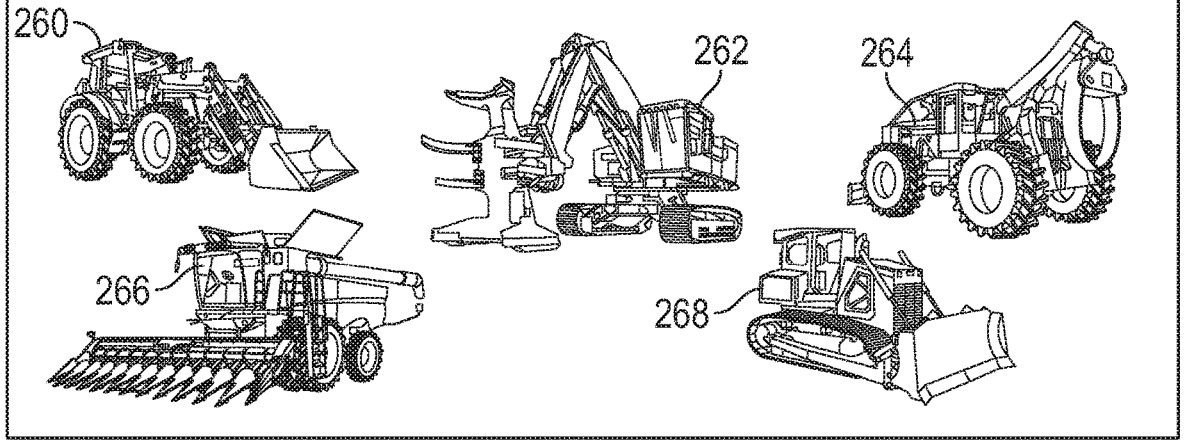
FIG. 7 is a graphic illustrating, in a non-exhaustive manner, additional example work vehicles into which embodiments of the MRF joystick system shown in FIGS. 1-6 may be beneficially integrated.

Additional Examples of Work Vehicles Beneficially Equipped with MRF Joystick Systems The foregoing has thus described an examples of an MRF joystick system including one or more joysticks biased toward joystick return positions, which can be adjusted to operator preference. While the foregoing description principally focuses on a particular type of work vehicle (an excavator) including a particular joystick-controlled work vehicle function (boom assembly movement), embodiments of the MRF joystick system are amenable to integration into a wide range of work vehicles containing joystick devices utilized to control varying work vehicle functions. Three additional examples of such work vehicles are set-forth in the upper portion of FIG. 7 and include a wheeled loader 226, a skid steer loader (SSL) 228, and a motor grader 230. Addressing first the wheeled loader 226, the wheeled loader 226 may be equipped with an example MRF joystick device 232 located within the cabin 234 of the wheeled loader 226. As indicated in FIG. 7, the MRF joystick device 232 may be utilized to control the movement of a FEL 236 terminating in a bucket 238. Comparatively, two MRF joystick devices 240 may be located in the cabin 242 of the example SSL 228 and utilized to control not only the movement of the FEL 244 and its bucket 246, but further control movement of the chassis 248 of the SSL 228 in the well-known manner. Finally, the motor grader 230 likewise includes two MRF joystick devices 240 located within the cabin 252 of the motor grader 230. The MRF joystick devices 250 can be utilized to control the movement of the motor grader chassis 254 (through controlling a first transmission driving the motor grader rear wheels and perhaps a second (e.g., hydrostatic) transmission driving the forward wheels), as well as movement of the blade 256 of the motor grader; e.g., through rotation of and angular adjustments to the blade-circle assembly 258, as well as adjustments to the side shift angle of the blade 256.

Any or all of the example wheeled loader 226, the SSL 228, and the motor grader 230 can be equipped with a work vehicle MRF joystick system of the type described herein; that is, an MRF joystick system including at least one joystick device having a joystick biased toward a joystick return position, an MRF joystick resistance mechanism, a JRP locking mechanism, and a controller architecture coupled to the MRF joystick resistance mechanism and the JRP locking mechanism. Further, the controller architecture may selectively enable operator adjustment of the joystick return position. To enable operator JRP adjustment, the controller architecture may command the JRP locking mechanism to unlock (if applicable), while further commanding the MRF joystick resistance mechanism to apply an MRF resistance force at a predetermined level until the JRP adjustment process completes. The controller architecture 50 may command the MRF joystick resistance mechanism 56 to generate a maximum MRF resistance force in embodiments in which the JRP locking mechanism 70 is external to the base housing 62 to prevent (or at least greatly deter) rotation of the joystick 60 relative to the base housing 62 during the JRP adjustment process. Comparatively, in embodiments in which the JRP locking mechanism is internal to the base housing, the controller architecture 50 may instead command the MRF joystick resistance mechanism 56 to apply a lesser (e.g., a minimum or zero) MRF resistance force during the JRP adjustment process, as discussed further below in connection with FIGS. 9-11. Still further examples of work vehicles usefully equipped with embodiments of the MRF joystick systems are illustrated in a bottom portion of FIG. 7 and include an FEL-equipped tractor 260, a feller buncher 262, a skidder 264, a combine 266, and a dozer 268.

Figure 8:
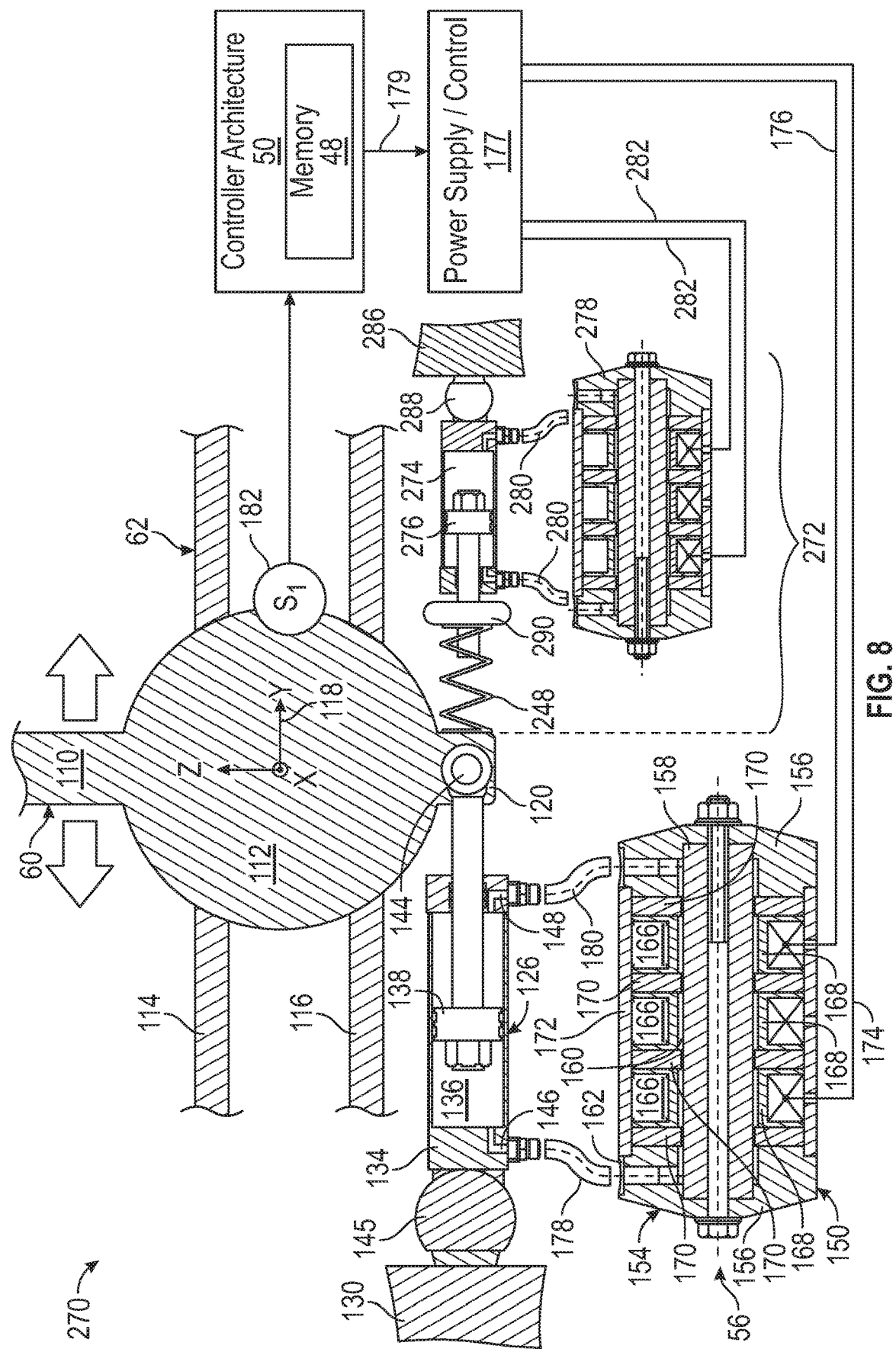
FIGS. 8 and 9 are schematics of an example MRF joystick device similar to that shown in FIGS. 3 and 4, respectively, in an alternative implementation in which a JRP locking mechanism is integrated into the base housing of a joystick device.
Figure 9:
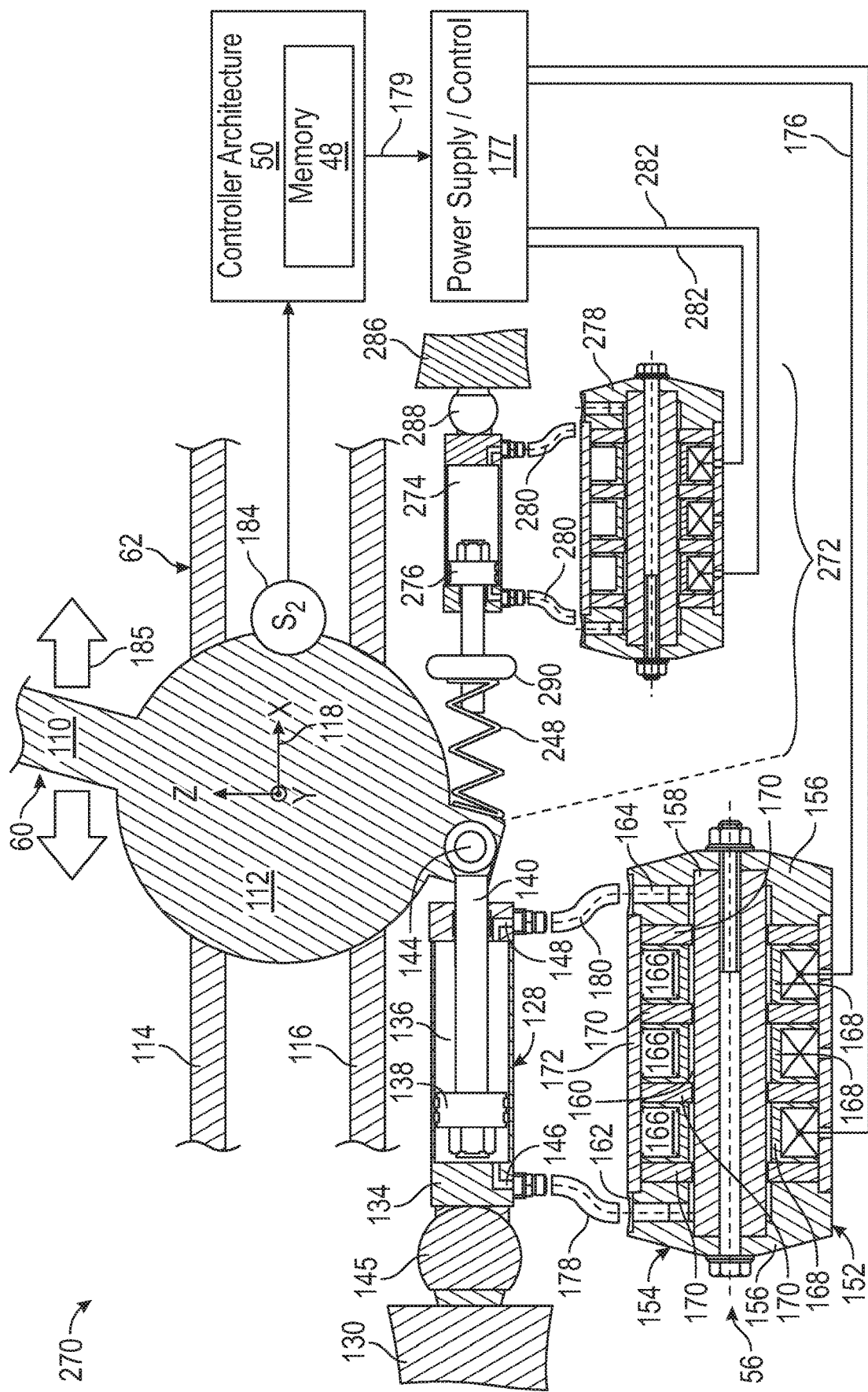

Example MRF Joystick System Including a JRP Locking Mechanism Internal to the Base Housing of the MRF Joystick Device Advancing next to FIGS. 8 and 9, simplified cross-sectional views of an MRF joystick device 270 are shown, as depicted in accordance with a further example embodiment of the present disclosure. In many respects, the MRF joystick device 270 is similar to the MRF joystick device 52 shown in FIGS. 1-6, with the cross-sections of FIGS. 8 and 9 generally corresponding to the cross-sections of FIGS. 3 and 4, respectively. Reference numerals have been carried forward as appropriate, and the common components shared by the MRF joystick device 270 (FIGS. 8 and 9) and the above-described MRF joystick device 52 (FIGS. 3 and 4) are not discussed in detail again to avoid redundancy. As does the previously-described MRF joystick device 52 (FIGS. 3 and 4), the MRF joystick device 270 includes a JRP locking mechanism 272 movable between locked and unlocked states. However, in the case of MRF joystick device 270, the JRP locking mechanism 272 is integrated into (located within) the base housing 62 of the joystick device 270. Two bias elements 284 are further disposed within the base housing 62 of the MRF joystick device 270 and cooperate to bias the joystick 60 toward a joystick return position. In this example, the bias elements 284 assume the form of mechanical (e.g., wireform) springs and are consequently referred to as "bias springs 284" hereafter. In further embodiments, however, the bias elements 284 may assume other forms suitable for exerting a bias force urging rotation of the joystick 60 toward a joystick return position when the joystick 60 is moved therefrom. Examples of other types of bias elements suitable for usage within the MRF joystick device 270 include gas springs, machined springs, and magnetic elements.

While contained within the base housing 62 in the illustrated embodiment, the JRP locking mechanism 272 of MRF joystick device 270 is similar to the external JRP locking mechanism described above in connection with FIGS. 5 and 6 in several respects. The JRP locking mechanism 272 includes two hydraulic cylinders 274, 276 and one or more shutoff valves 278, which are fluidly interconnected with the hydraulic cylinders 274, 276 via flow line connections 280. In this particular example, the shutoff valves 278 are generically illustrated as MRF valves, each having a construction similar to the MRF valves 56 further contained in the base housing 62 and utilized to selectively apply an MRF resistance force inhibiting joystick movement. Electrical connections 282 are provided from the power supply 177 to the shutoff valves 278, with the controller architecture 50 regulating power supply to the shutoff valves 278 to provide the desired flow control functionality through modifications to the current or voltage applied to the EM coils within the valves 278. Again, in alternative embodiments, the shutoff valves 278 can be readily implemented as non-MRF valves containing valve elements, such as stoppers, spools, or plates, positioned by the controller architecture 50 utilizing a solenoid or other electrical actuator. The hydraulic cylinders 274, 276 of the MRF joystick device 270 are also similar to the hydraulic cylinders 204, 206 contained in the MRF joystick device 52, as described above in connection with FIG. 6; however, in the present example, the hydraulic cylinders 274, 276 are increasingly compact and integrated into the base housing 62 of the MRF joystick device 270. Additionally, in the example of FIGS. 8 and 9, the hydraulic cylinders 274, 276 effectively serve as adjustable spring seats, which set the joystick return position of the MRF joystick device 270 through changes in the positioning of the bias springs 284 acting on the joystick 60, as further discussed below.

As noted above, the JRP locking mechanism 272 includes two hydraulic cylinders 274, 276 and two bias springs 284 in the illustrated example. In further embodiments, the JRP locking mechanism 272 can include a greater or lesser number of hydraulic cylinders and bias springs depending upon joystick device design and the manner in which the joystick can be moved relative to the base housing 62; e.g., in implementations in which the joystick 60 is rotatable about a single axis or is otherwise movable in a single DOF, the JRP locking mechanism 272 can include a single spring-cylinder pair or, perhaps, two spring-cylinder pairs positioned on opposing sides of the joystick 60. The hydraulic cylinders 274, 276 each include, in turn, a cylinder body 274 and a translating piston 276, the head of which is slidably disposed within the bore of the cylinder body 274. The outer terminal end of each cylinder body 274 (the rightmost ends of the cylinder bodies 274 in orientation shown in FIGS. 8 and 9) is mounted to an internal infrastructure feature 286 of the base housing 62. This mounting is effectuated utilizing a movable coupling, such as a spherical joint 288, permitting the cylinders 274, 276 to tilt or swivel in conjunction with operator rotation of the joystick 60 and deflection of the bias springs 284. The opposing ends of the hydraulic cylinders 274, 276, and specifically an outer terminal (rod) end of each piston 276 serves as a spring seat, which supports at least one of the bias springs 284. The pistons 276 may terminate in spring retention pieces or spring seats 290, which secure the bias springs 284 to the outer piston ends. The opposing ends of the bias springs 284 are joined to a lower portion of joystick 60 and, specifically, affixed to the lower joystick extension 120 as shown.

By virtue of the above-described structural configuration, each bias spring 284 can compress or extend to exert a bias force urging return of the joystick 60 to the joystick return position. With respect to the bias spring 284 shown in FIG. 8, in particular, this bias spring extends and compresses in conjunction with rotation of the joystick about the X-axis of coordinate legend 118. Beginning from the joystick return position shown in FIG. 8, rotation of the joystick handle 110 in a leftward direction will cause movement of the lower joystick extension 120 in a rightward direction to compress the bias spring 284 against the spring seat 290. So compressed, the bias spring 284 exerts a pushing force on the lower portion or extension 120 of the joystick 60 urging return of the joystick 60 to the joystick return position. Conversely, rotation of the joystick handle 110 in a rightward direction will cause movement of the lower joystick extension 120 in a leftward direction extending the bias spring 284. Thus, in this instance, the bias spring 284 exerts a pulling force on the lower extension 120 of the joystick 60 again urging return of the joystick 60 to the joystick return position. In a similar manner, the bias spring 284 shown in FIG. 9 extends and retracts in conjunction with rotation of the joystick about the Y-axis of coordinate legend 118 to further bias the joystick 60 toward the joystick return position. Essentially, then, the joystick return position is the angular position at which the net spring forces exerted on the joystick 60 balance; and, in the illustrated example, the position at which each of the bias springs 284 generally reside in a non-deflected state and exert little to no spring force on lower joystick extension 120. Translational movement of the piston ends 276 and the spring seats 290 thus adjusts the angular position of the joystick 60 at which the bias springs 284 reside in their non-deflected state and, therefore, the joystick return position toward which the bias spring 284 urge rotation of the joystick 60.

Operator adjustment of the joystick return position of the MRF joystick device 270 may be accomplished as follows. First, the operator provides some form of input, as received by the controller architecture 50, initiating the JRP adjustment process. As noted above in conjunction with the MRF joystick device 52, the operator input can be provided by physical interaction with a manual input provided on the joystick 60 or on the base housing 62; or, instead, may occur via operator interaction with a GUI generated on the screen of the display device 80. In response to such operator input, the controller architecture 50 unlocks the JRP locking mechanism 272 to permit operator adjustment of the joystick return position. In the embodiment of FIGS. 8 and 9, the controller architecture 50 unlocks the JRP locking mechanism 272 by commanding the shutoff valves 278 to temporarily permit fluid flow between the opposing chambers of the cylinders 274, 276, as previously described. This enables the piston 276 of each cylinder 274, 276 and the spring seats 290 to translate freely in conjunction with operator-induced rotation of the joystick 60. The work vehicle operator may thus grasp the joystick handle 110 and rotate the joystick 60 into any selected joystick return position permitted within the physical limitations of the MRF joystick device 270. As the operator moves the joystick 60 in this manner, the bias springs 284 deflect to exert forces on their associated pistons 276, which then translate to a new position to zero-out the spring forces generated by operator movement of the joystick 60 during JRP adjustment.

After adjusting the joystick 60 to a desired joystick return position, the operator then enters additional input into the MRF joystick system 270 terminating the JRP adjustment process. Upon receipt of this input, the controller architecture 50 commands the JRP locking mechanism 272 to revert to the locked state in which the JRP locking mechanism 272 normally resides during usage of the MRF joystick device 270. In the present example, the controller architecture 50 commands the shutoff valves 278 to again close or to otherwise prevent fluid flow between the chambers of the cylinders contained in the MRF joystick device 270; e.g., when the shutoff valves 278 are MRF valves, as shown, the controller architecture 50 causes sufficient energization of the EM coils contained in the MRF valves 278 to prevent or at least significantly impede magnetorheological fluid flow through the valves 278. The pistons 276, and corresponding spring seats 290, are consequently secured in their current translational position, thereby positioning the bias springs 284 to reside in an essentially non-deflected state at the new, operator-adjusted joystick return position. Supported by the pistons 276 in this manner, the bias springs 284 within the MRF joystick device 270 now bias the joystick 60 of the MRF joystick device 270 to the operator-adjusted joystick return position. An operator may then return to normal usage of the MRF joystick device 270 until the JRP adjustment process is initiated again.

In the above-described manner, the work vehicle MRF joystick system 22 enables operator adjustment of the joystick return position of a given MRF joystick device (here, the MRF joystick device 270) utilizing a highly intuitive, manually-driven process during which an operator rotates a joystick (e.g., the joystick 60) into a desired joystick return position. By enabling an operator to physically move the joystick handle 110 into a desired JRP position, an intuitive JRP position adjustment process is established during which an operator may generally relax the operator's arm and wrist to allow the joystick to gradually move into the JRP position best suited for the operator's unique physiology. Additionally, such a manually-driven adjustment process generally enables the elimination of linear or rotary actuators in effectuating the desired JRP position adjustments. The overall cost and complexity of the MRF joystick system may be decreased as a result.

In embodiments in which the JRP locking mechanism is external to the base housing, including in the example embodiment shown in FIGS. 8 and 9, it may be desirable to adjust the position at which certain MRF effects are generated when an operator-adjusted joystick return position is displaced from the default or non-modified joystick return position. When hold or feel MRF detents are desirably generated during joystick operation, for example, it may be desirable to adjust the position at which the MRF detents are generated in conjunction with operator adjustments to the joystick return position. Additionally or alternatively, MRF motion stops may be generated at certain locations to compensate for asymmetries in joystick ROM, which otherwise result due to displacement of the joystick return position from the default, non-modified, or "true center" position. Further description in this regard will now be provided in connection with FIGS. 10 and 11; while noting that, in other embodiments, such positional adjustments in the locations at which MRF effects are generated may not be implemented, particularly as the angular deviation between an operator-adjusted joystick return position and the default joystick return position will often be relatively minor in many instances.

Figure 10:
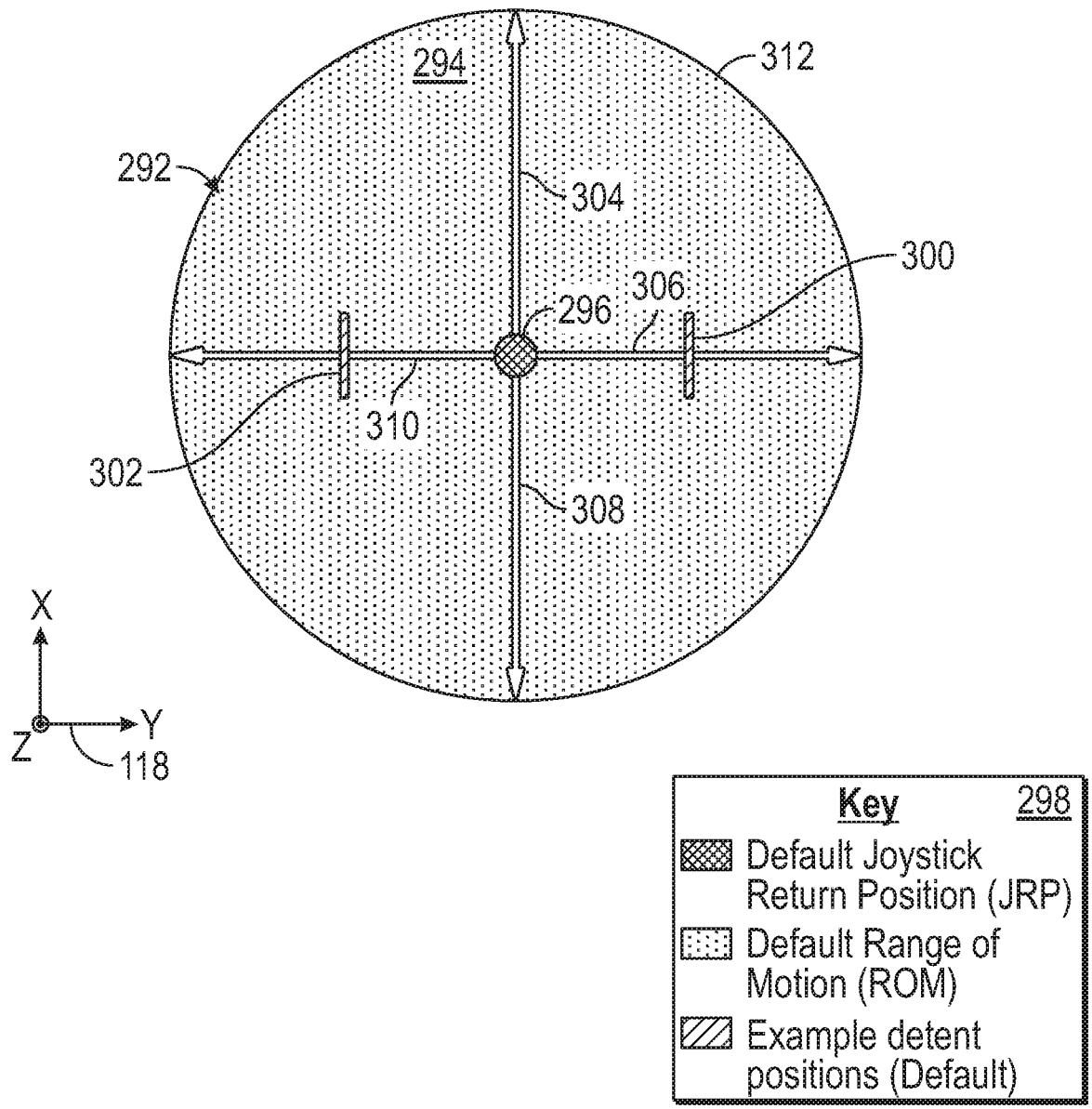
FIGS. 10 and 11 are top-down schematics illustrating one manner in which the positioning at which certain MRF resistance effects (e.g., MRF motion stops and/or detents) are generated during operation of the example MRF joystick device (FIGS. 8 and 9) may be modified in conjunction with operator adjustment of the joystick return position.
Figure 11:
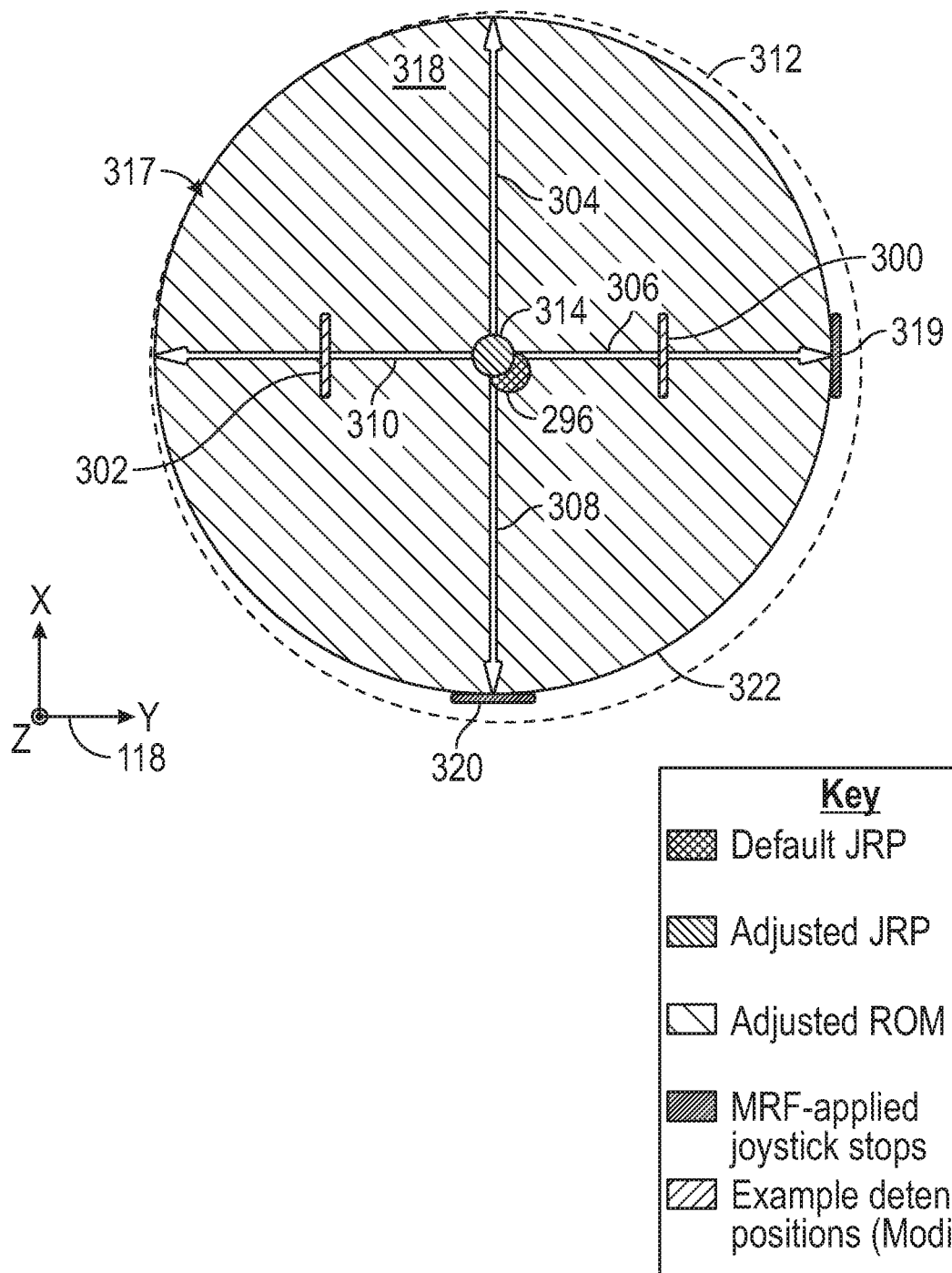

FIGS. 10 and 11 schematically illustrate an example manner in which the positioning of certain MRF resistance effects may be modified in conjunction with the adjustment of the joystick resistance position. Referring initially to FIG. 10, a schematic 292 illustrates a default joystick ROM 294 of an example MRF joystick device (e.g., the joystick device 270 shown in FIGS. 8 and 9) when the joystick return position resides in a default or non-adjusted position, as denoted by marker 296. A key 298 identifies different cross-hatch patterns for the default joystick ROM 294 and the default joystick return position 296, as well as an example default positioning of two MRF detents 300, 302. From the default joystick return position 296, the joystick can be rotated by an operator about the X- or Y-axes of coordinate legend 118 in any given direction 304, 306, 308, 310. When the joystick is rotated in the direction 306 (to the operator's right) into the detent position 300, the controller architecture 50 commands the MRF joystick resistance mechanism 56 to generate an increased MRF resistance force inhibiting further rotation of the joystick in the right direction 304, thereby producing the desired MRF detent effect. Similarly, when the joystick is rotated in the opposing direction 308 (to the operator's left) into the detent position 300, the controller architecture 50 commands the MRF joystick resistance mechanism 56 to generate an increased MRF resistance force inhibiting further rotation of the joystick to generate the desired MRF detent effect. The joystick generally cannot be rotated beyond the periphery 312 of the default joystick ROM 294 due to the physical limitations of the MRF joystick device itself.

Turning to FIG. 11, an example scenario (schematic 317) is shown following operator adjustment of the joystick return position from a default position (marker 296) to a newly-selected joystick return position 314. As indicated by a key 316, the controller architecture 50 of the MRF joystick system may perform either or both of two functions to modify operation of the MRF joystick in accordance with the operator adjustments to the joystick return position. First, the controller architecture 50 may generate MRF motion stops to strategically restrict the joystick ROM, as indicated in FIG. 11 by circle graphic 318 (hereafter, the "modified ROM 318"). When the joystick is rotated from the modified joystick return position (marker 314) in the right direction 306, the controller architecture 50 may command the MRF joystick resistance mechanism 56 to generate an MRF joystick stop 318 at the terminal location corresponding to an outer periphery 322 of the modified ROM 318. This equalizes the ROM or travel of the joystick when rotated about the X-axis of coordinate legend 118 from the modified joystick return position in the right direction 306 with joystick travel when rotated about the X-axis of the coordinate legend 118 from the modified joystick return position in the opposing left direction 310. Absent the generation of MRF motion stop 318, the joystick can be rotated in the right direction 306 to the outer periphery 312 of the default ROM, resulting in a longer joystick travel in right direction 306 than in the left direction 310. Thus, by generating the MRF joystick stop 318 encountered when rotating the joystick in the right direction 306, symmetry in joystick rotation about the X-axis of coordinate legend 118 from the operator-adjusted joystick return position (marker 314) is maintained.

In a similar regard, the controller architecture 50 may generate a second MRF motion stop 320 at an appropriate location when the joystick is rotated about the Y-axis of coordinate legend 118 from the modified joystick return position (marker 314) in the downward direction 308 (toward the operator) to further equalize the joystick's angular ROM about this axis. Absent the generation of MRF motion stop 320, an operator could potentially rotate the joystick in downward direction 308 to the outer periphery 312 of the default ROM, again resulting in a rotational asymmetry relative to the modified joystick return position (marker 314). By generating the MRF joystick stop 318 preventing over-travel of the joystick when rotating the joystick in the downward direction 308, symmetry in joystick ROM when the joystick is rotated about the Y-axis of coordinate legend 118 is restored. Similar MRF motion stops may also be generated along the portions of the periphery 322 of the modified or restricted joystick ROM 318, which are nonaligning with the periphery 312 of the default joystick ROM 294. In this manner, the controller architecture 50 leverages the MRF capabilities of the MRF joystick device to impose artificial limits on joystick travel to maintain symmetry in the joystick ROM in the direction(s) opposite displacement of the modified joystick return position (marker 314) relative to the default joystick return position (marker 296). Joystick ROM remains restricted by the physical limitations of the MRF joystick device in the direction(s) corresponding to the displacement of the modified joystick return position (marker 314) relative to the default joystick return position (marker 296). In other embodiments, such MRF motion stops 319, 320 may not be generated.

The locations at the MRF detents 300, 302 may likewise be adjusted in conjunction with operator adjustment of the joystick return position (marker 314) in at least some implementations. As the joystick return position is shifted in a particular manner due to operator adjustment (in the example of FIG. 11, in an upward and leftward direction), the positions at which the MRF detents 300, 302 may be shifted in a corresponding manner. Additionally, adjustments may be made to the positions at which the MRF detents 300, 302 are generated to accommodate any truncation of the joystick ROM when rotated about a particular axis along which one or more MRF motion stops are desirably applied. To determine the appropriate modified locations at which to generate such the MRF effects following operator adjustment of the joystick return position, the controller architecture 50 tracks the joystick movement during the above-described operator JRP adjustment process and stores the location of the operator-adjusted joystick return position when the JRP adjustment process concludes; e.g., the operator-adjusted joystick return position may be stored as coordinates or as an angular deviation from the default joystick return position. The controller architecture 50 then considers the location of the modified joystick return position (marker 314) along with pertinent data (e.g., data indicating the default ROM of the joystick, such as the default angular range over the joystick can be rotated about a given axis from the default joystick return position (marker 296)) to determine the appropriate locations at which to generate any MRF detents (e.g., MRF detents 300, 302) and any MRF motion stops (e.g., MRF motion stops 319, 320), as desired.

Enumerated Examples of the Work Vehicle MRF Joystick System

The following examples of the work vehicle MRF joystick system are further provided and numbered for ease of reference.

1. In embodiments, a work vehicle MRF joystick system is provided for usage onboard a work vehicle. The work vehicle MRF joystick system includes a joystick device having a base housing and a joystick, which is rotatable relative to the base housing and which is biased toward a joystick return position. An MRF joystick resistance mechanism is controllable to vary an MRF resistance force impeding movement of the joystick relative to the base housing. A controller architecture is coupled to the MRF joystick resistance mechanism and is configured to: (i) selectively enable an operator adjustment of the joystick return position by a work vehicle operator; and (ii) when enabling the operator adjustment of the joystick return position, command the MRF joystick resistance mechanism to maintain the MRF resistance force at a predetermined level until the operator adjustment of the joystick return position is terminated.

2. The work vehicle MRF joystick system of example 1, further including a JRP locking mechanism movable between an unlocked state in which the JRP locking mechanism permits adjustment of the joystick return position and a locked state in which the JRP locking mechanism prevents adjustment of the joystick return position.

3. The work vehicle MRF joystick system of example 2, wherein the JRP locking mechanism is external to the base housing, while the controller architecture is configured to maintain the MRF resistance force substantially at a maximum level until the operator adjustment of the joystick return position is terminated.

4. The work vehicle MRF joystick system of example 2, wherein the JRP locking mechanism is internal to the base housing, while the controller architecture is configured to maintain the MRF resistance force at a minimum level until the operator adjustment of the joystick return position is terminated.

5. The work vehicle MRF joystick system of example 2, wherein the controller architecture is coupled to the JRP locking mechanism and is further configured to: (i) command the JRP locking mechanism to move into the unlocked state when receiving an operator adjustment of the joystick return position; and (ii) return the JRP locking mechanism to the locked state when the operator adjustment of the joystick return position is terminated.

6. The work vehicle MRF joystick system of example 2, further including a support structure adjacent the base housing and a coupling joining the base housing to the support structure. The JRP locking mechanism is coupled between the support structure and the base housing. The coupling enables rotation of the base housing relative to the support structure in at least one degree of freedom when the JRP locking mechanism is in the unlocked state.

7. The work vehicle MRF joystick system of example 2, wherein the JRP locking mechanism includes a hydraulic cylinder having opposing hydraulic chambers. A shutoff valve is fluidly coupled between the opposing hydraulic chambers and is operably coupled to the controller architecture. The shutoff valve is controllable to selectively prevent fluid flow between the opposing hydraulic chambers to lock the hydraulic cylinder in a translational position.

8. The work vehicle MRF joystick system of example 7, wherein the hydraulic cylinder is mechanically coupled between the base housing and a lower portion of the joystick.

9. The work vehicle MRF joystick system of example 7, further including a support structure to which the base housing is movably mounted. The hydraulic cylinder is mechanically coupled between the base housing and the support structure.

10. The work vehicle MRF joystick system of example 7, wherein the shutoff valve includes an MRF valve, which is selectively energized by the controller architecture to substantially prevent MRF fluid flow through the MRF valve when the JRP locking mechanism is in the locked state.

11. The work vehicle MRF joystick system of example 1, further including a computer-readable memory coupled to the controller architecture. The controller architecture is configured to store JRP setting data in the computer-readable memory following adjustment of the joystick return position by the work vehicle operator, with the JRP setting data describing an operator-adjusted joystick return position of the joystick device.

12. The work vehicle MRF joystick system of example 11, wherein the controller architecture is further configured to: (i) selectively generate an MRF resistance effect at a predetermined position encountered when rotating the joystick about a rotational axis, the MRF resistance effect assume the form of an MRF detent or an MRF motion stop; and (ii) adjust the predetermined position at which the MRF resistance effect is generated when the operator adjustment of the joystick return position deviates from a default joystick return position.

13. The work vehicle MRF joystick system of example 12, wherein the MRF resistance effect assumes the form of an MRF motion stop. The controller architecture is configured to generate the MRF motion stop at a location substantially equalizing a first ROM of the joystick with a second ROM of the joystick. The first ROM is measured when rotating the joystick from the operator-adjusted joystick return position about the rotational axis in a first direction, while the second ROM is measured when rotating the joystick from the operator-adjusted joystick return position about the rotational axis in a second direction opposite the first direction.

14. In further embodiments, the work vehicle MRF joystick system includes a joystick device having a base housing and a joystick, which is rotatable relative to the base housing and which is biased toward a joystick return position. The work vehicle MRF joystick system further includes an MRF joystick resistance mechanism controllable to vary an MRF resistance force impeding movement of the joystick relative to the base housing, a JRP locking mechanism external to the base housing, and a controller architecture coupled to the MRF joystick resistance mechanism and to the JRP locking mechanism. The JRP locking mechanism is movable between a locked state preventing adjustment of the joystick return position and an unlocked state permitting adjustment of the joystick return position. The controller architecture is configured to: (i) when receiving an operator adjustment of the joystick return position, command the MRF joystick resistance mechanism to generate a maximum MRF resistance force substantially preventing movement of the joystick relative to the base housing; and (ii) command the MRF joystick resistance mechanism to remove the maximum MRF resistance force when the operator adjustment of the joystick return position is terminated.

15. The work vehicle MRF joystick system of example 14, wherein the controller architecture is coupled to the JRP locking mechanism and is further configured to: (i) command the JRP locking mechanism to move into the unlocked state when receiving the operator adjustment of the joystick return position; and (ii) return the JRP locking mechanism to the locked state when the operator adjustment of the joystick return position is terminated.

CONCLUSION

The foregoing has provided work vehicle MRF joystick systems including at least one joystick biased to return to a joystick return position, which is adjustable to operator preference. Embodiments of the MRF joystick system enable adjustment of the joystick return position utilizing an intuitive, manually-driven process in which an operator moves a joystick into a desired joystick return position by physical manipulation of the joystick handle. Such a manually-driven JRP adjustment process not only provides an intuitive mechanism by which a work vehicle operator can adjust the joystick return position to best suit the operator's unique physiology, but may further allow the elimination of (or reduced reliance upon) actuators that may otherwise be employed to provide actuator-driven adjustments of the joystick return position. Embodiments of the MRF joystick system leverage the unique MRF capabilities of the MRF joystick (or joysticks) included in the joystick system to enable such a manually-driven JRP adjustment approach; e.g., by setting an MRF resistance force at a predetermined level (e.g., a minimum or zero level in embodiments in which the JRP locking mechanism is internal to the base housing, or a maximum level in embodiments in which the JRP locking mechanism is external to the base housing) until the operator adjustment of the joystick return position is terminated.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle magnetorheological fluid (MRF) joystick system for usage onboard a work vehicle, the work vehicle MRF joystick system comprising:
   a joystick device, comprising:
      a base housing; and
      a joystick rotatable relative to the base housing and biased toward a joystick return position;
   an MRF joystick resistance mechanism controllable to vary an MRF resistance force impeding movement of the joystick relative to the base housing;
   a controller architecture coupled to the MRF joystick resistance mechanism, the controller architecture configured to:
      selectively enable an operator adjustment of the joystick return position by a work vehicle operator; and
      when enabling the operator adjustment of the joystick return position, command the MRF joystick resistance mechanism to maintain the MRF resistance force at a predetermined level until the operator adjustment of the joystick return position is terminated.

2. The work vehicle MRF joystick system of claim 1, further comprising a joystick return position (JRP) locking mechanism movable between:
   an unlocked state in which the JRP locking mechanism permits adjustment of the joystick return position; and
   a locked state in which the JRP locking mechanism prevents adjustment of the joystick return position.

3. The work vehicle MRF joystick system of claim 2, wherein the JRP locking mechanism is external to the base housing; and
   wherein the controller architecture is configured to maintain the MRF resistance force substantially at a maximum level until the operator adjustment of the joystick return position is terminated.

4. The work vehicle MRF joystick system of claim 2, wherein the JRP locking mechanism is internal to the base housing; and
wherein the controller architecture is configured to maintain the MRF resistance force at a minimum level until the operator adjustment of the joystick return position is terminated.

5. The work vehicle MRF joystick system of claim 2, wherein the controller architecture is coupled to the JRP locking mechanism and is further configured to:
command the JRP locking mechanism to move into the unlocked state when receiving an operator adjustment of the joystick return position; and
return the JRP locking mechanism to the locked state when the operator adjustment of the joystick return position is terminated.

6. The work vehicle MRF joystick system of claim 2, further comprising:
a support structure adjacent the base housing, the JRP locking mechanism coupled between the support structure and the base housing; and
a coupling joining the base housing to the support structure, while enabling rotation of the base housing relative to the support structure in at least one degree of freedom when the JRP locking mechanism is in the unlocked state.

7. The work vehicle MRF joystick system of claim 2, wherein the JRP locking mechanism comprises:
a hydraulic cylinder having opposing hydraulic chambers; and
a shutoff valve fluidly coupled between the opposing hydraulic chambers and operably coupled to the controller architecture, the shutoff valve controllable to selectively prevent fluid flow between the opposing hydraulic chambers to lock the hydraulic cylinder in a translational position.

8. The work vehicle MRF joystick system of claim 7, wherein the hydraulic cylinder is mechanically coupled between the base housing and a lower portion of the joystick.

9. The work vehicle MRF joystick system of claim 7, further comprising a support structure to which the base housing is movably mounted, the hydraulic cylinder mechanically coupled between the base housing and the support structure.

10. The work vehicle MRF joystick system of claim 7, wherein the shutoff valve comprises an MRF valve, which is selectively energized by the controller architecture to substantially prevent MRF fluid flow through the MRF valve when the JRP locking mechanism is in the locked state.

11. The work vehicle MRF joystick system of claim 1, further comprising a computer-readable memory coupled to the controller architecture;
wherein the controller architecture is configured to store JRP setting data in the computer-readable memory following adjustment of the joystick return position by the work vehicle operator, the JRP setting data describing an operator-adjusted joystick return position of the joystick device.

12. The work vehicle MRF joystick system of claim 11, wherein the controller architecture is further configured to:
selectively generate an MRF resistance effect at a predetermined position encountered when rotating the joystick about a rotational axis, the MRF resistance effect comprising one of an MRF detent and MRF motion stop; and
adjust the predetermined position at which the MRF resistance effect is generated when the operator adjustment of the joystick return position deviates from a default joystick return position.

13. The work vehicle MRF joystick system of claim 12, wherein the MRF resistance effect comprises an MRF motion stop; and
wherein the controller architecture is configured to generate the MRF motion stop at a location substantially equalizing a first range of motion (ROM) of the joystick with a second ROM of the joystick;
wherein the first ROM is measured when rotating the joystick from the operator-adjusted joystick return position about the rotational axis in a first direction; and
wherein the second ROM is measured when rotating the joystick from the operator-adjusted joystick return position about the rotational axis in a second direction opposite the first direction.

14. A work vehicle magnetorheological fluid (MRF) joystick system for usage onboard a work vehicle, the work vehicle MRF joystick system comprising:
a joystick device, comprising:
a base housing; and
a joystick rotatable relative to the base housing and biased toward a joystick return position;
an MRF joystick resistance mechanism controllable to vary an MRF resistance force impeding movement of the joystick relative to the base housing;
a joystick return position (JRP) locking mechanism external to the base housing, the JRP locking mechanism movable between a locked state preventing adjustment of the joystick return position and an unlocked state permitting adjustment of the joystick return position; and
a controller architecture coupled to the MRF joystick resistance mechanism and to the JRP locking mechanism, the controller architecture configured to:
when receiving an operator adjustment of the joystick return position, command the MRF joystick resistance mechanism to generate a maximum MRF resistance force substantially preventing movement of the joystick relative to the base housing; and
command the MRF joystick resistance mechanism to remove the maximum MRF resistance force when the operator adjustment of the joystick return position is terminated.

15. The work vehicle MRF joystick system of claim 14, wherein the controller architecture is coupled to the JRP locking mechanism and is further configured to:
command the JRP locking mechanism to move into the unlocked state when receiving the operator adjustment of joystick return position; and
return the JRP locking mechanism to the locked state when the operator adjustment of the joystick return position is terminated.

16. The work vehicle MRF joystick system of claim 14, further comprising:
a support structure adjacent the base housing, the JRP locking mechanism coupled between the support structure and the base housing; and
a coupling joining the base housing to the support structure, the coupling enabling rotation of the base housing relative to the support structure in at least one degree of freedom when the JRP locking mechanism is in the unlocked state.

17. The work vehicle MRF joystick system of claim 16, wherein the JRP locking mechanism comprises:
a hydraulic cylinder having opposing hydraulic chambers, a first end portion attached to the support structure, and a second end portion attached to the base housing; and
a shutoff valve fluidly coupled between the opposing hydraulic chambers and operably coupled to the controller architecture, the shutoff valve controllable to selectively prevent fluid flow between the opposing hydraulic chambers to lock the hydraulic cylinder in a translational position.

18. A work vehicle magnetorheological fluid (MRF) joystick system for usage onboard a work vehicle, the work vehicle MRF joystick system comprising:
a joystick device, comprising:
a base housing;
a joystick rotatable relative to the base housing;
a spring contained in the base housing and exerting a resilient bias force on the joystick urging the joystick toward a joystick return position; and
an adjustable spring support having a first end portion mounted to the base housing and have a second end supporting the spring;
an MRF joystick resistance mechanism controllable to vary an MRF resistance force impeding movement of the joystick relative to the base housing; and
a joystick return position (JRP) locking mechanism at least partially contained in the base housing and coupled to the adjustable spring support, the JRP locking mechanism movable between a locked state preventing positional adjustment of the adjustable spring support and an unlocked state permitting positional adjustment of the adjustable spring support.

19. The work vehicle MRF joystick system of claim 18, further comprising a controller architecture coupled to the MRF joystick resistance mechanism and to the JRP locking mechanism, the controller architecture configured to:
when receiving an operator adjustment of the joystick return position, command the JRP locking mechanism to move into the unlocked state; and
return the JRP locking mechanism to the locked state when determining that the operator adjustment of the joystick return position has terminated.

20. The work vehicle MRF joystick system of claim 19, wherein the JRP locking mechanism comprises:
a hydraulic cylinder having opposing hydraulic chambers; and
a shutoff valve fluidly coupled between the opposing hydraulic chambers and operably coupled to the controller architecture, the shutoff valve controllable to selectively prevent fluid flow between the opposing hydraulic chambers to lock the hydraulic cylinder in a translational position.

* * * * *